Figure 11:
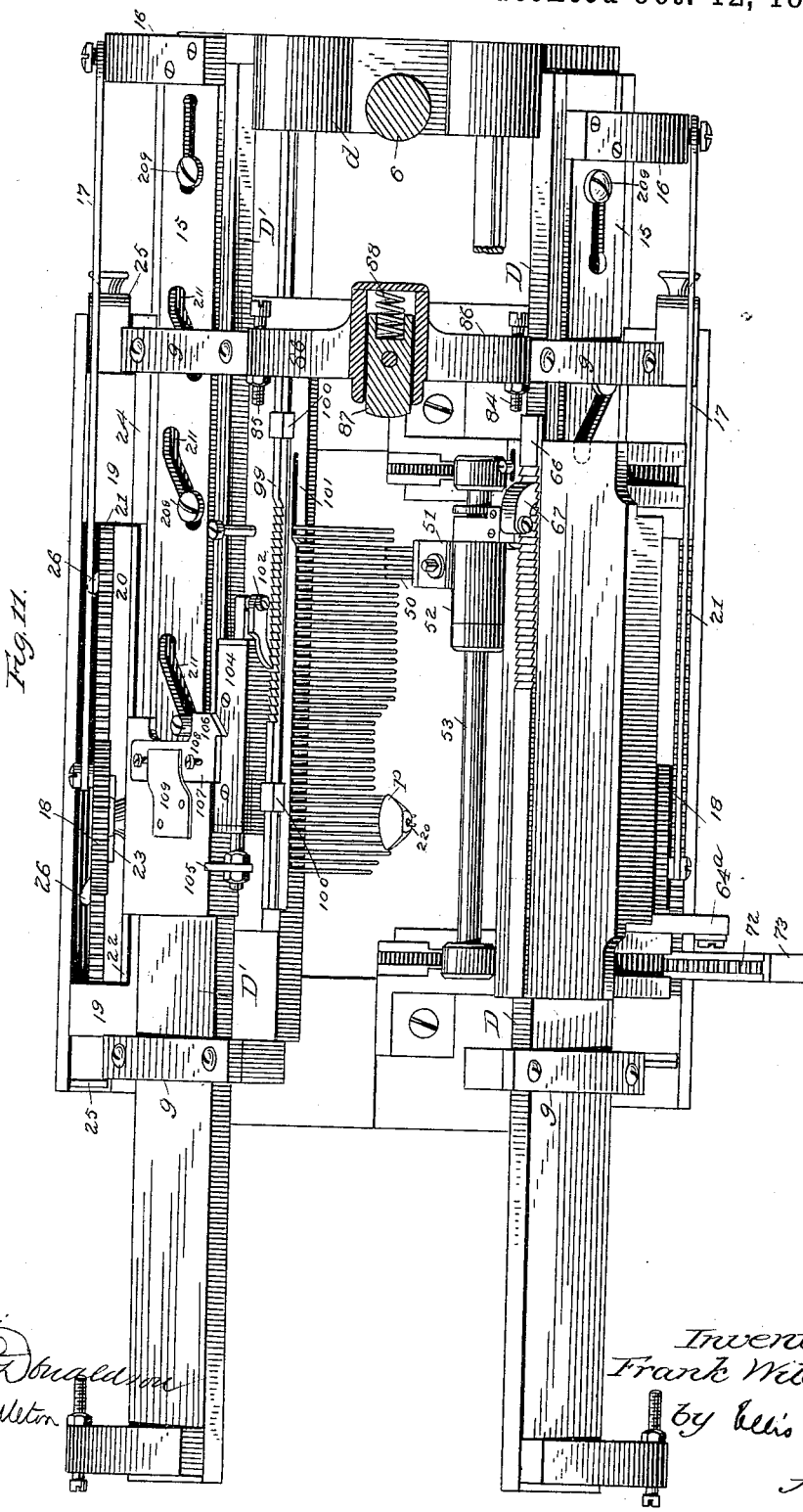

(No Model.)    14 Sheets—Sheet 1.
F. WILCOMB.
STRAIGHT KNITTING MACHINE.
No. 350,795. Patented Oct. 12, 1886.
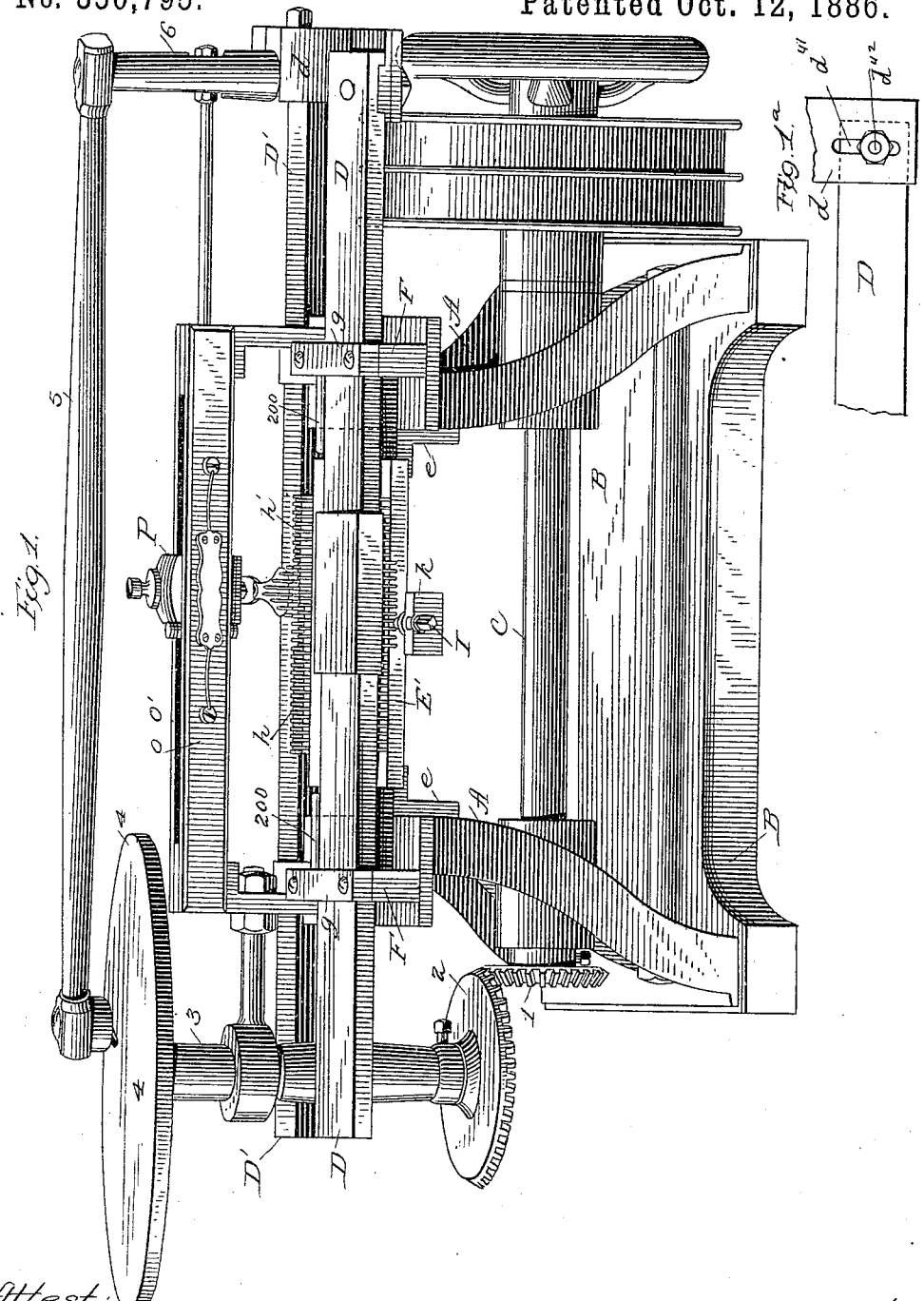
Attest:
Waller Donaldson
Frank L. Middleton
Inventor:
Frank Wilcomb
by Ellis Spear
Atty.

(No Model.) 14 Sheets—Sheet 2.
F. WILCOMB.
STRAIGHT KNITTING MACHINE.
No. 350,795. Patented Oct. 12, 1886.
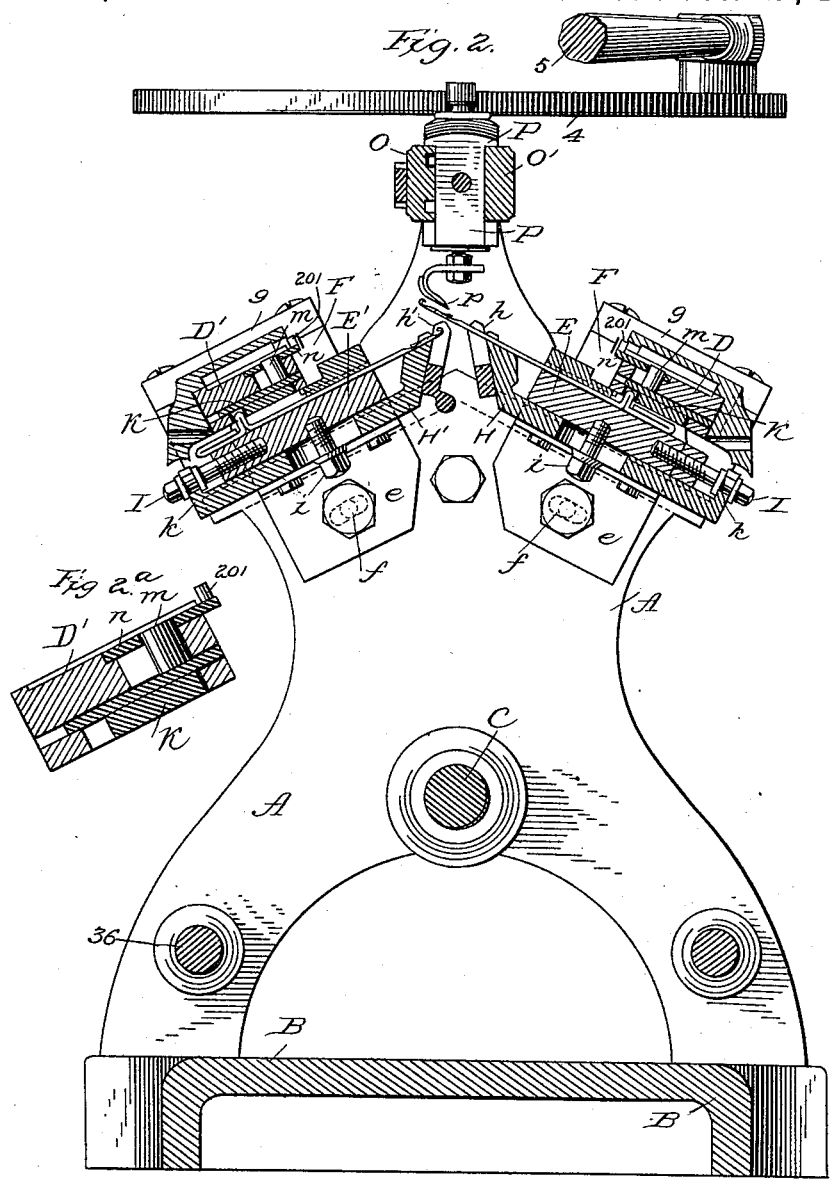
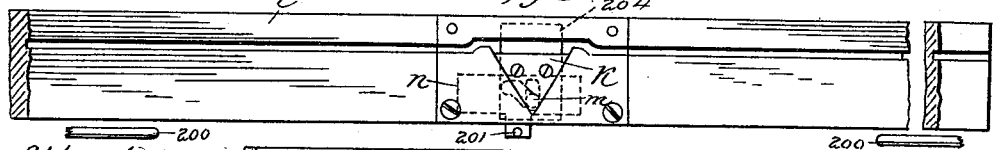
Attest:
Walter Donaldson
F. L. Middleton
Inventor
Frank Wilcomb
by Ellis Spear
Atty.

(No Model.)
F. WILCOMB.
STRAIGHT KNITTING MACHINE.
No. 350,795. Patented Oct. 12, 1886.
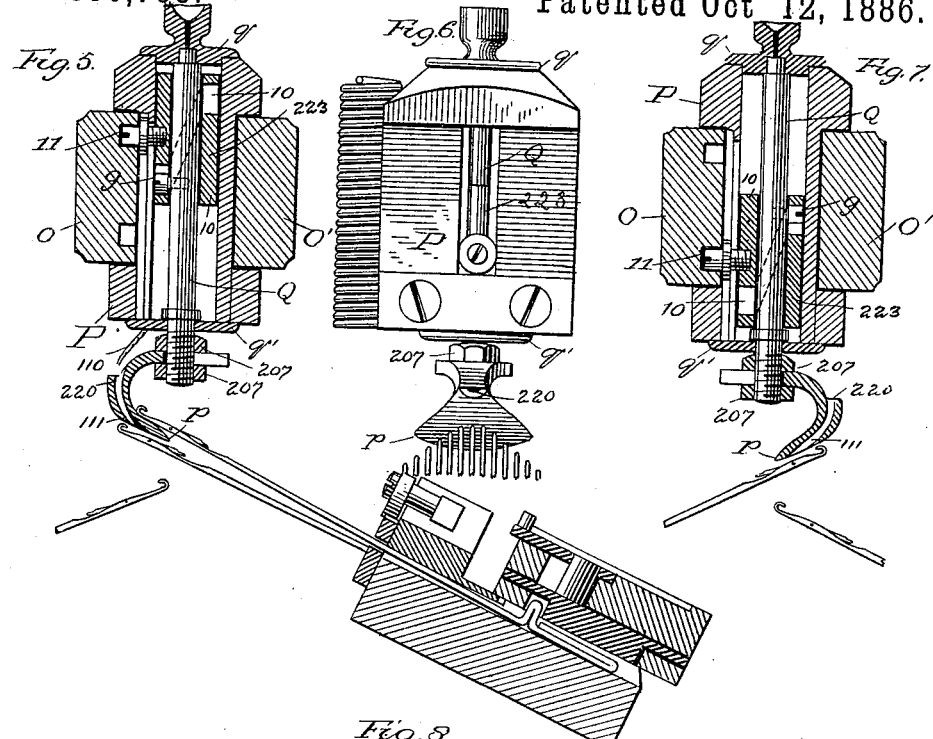
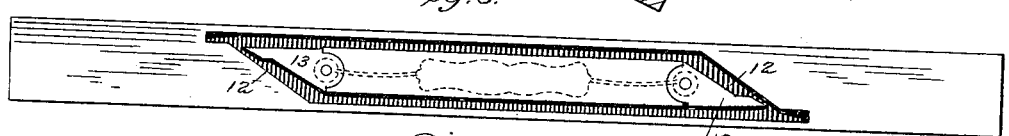

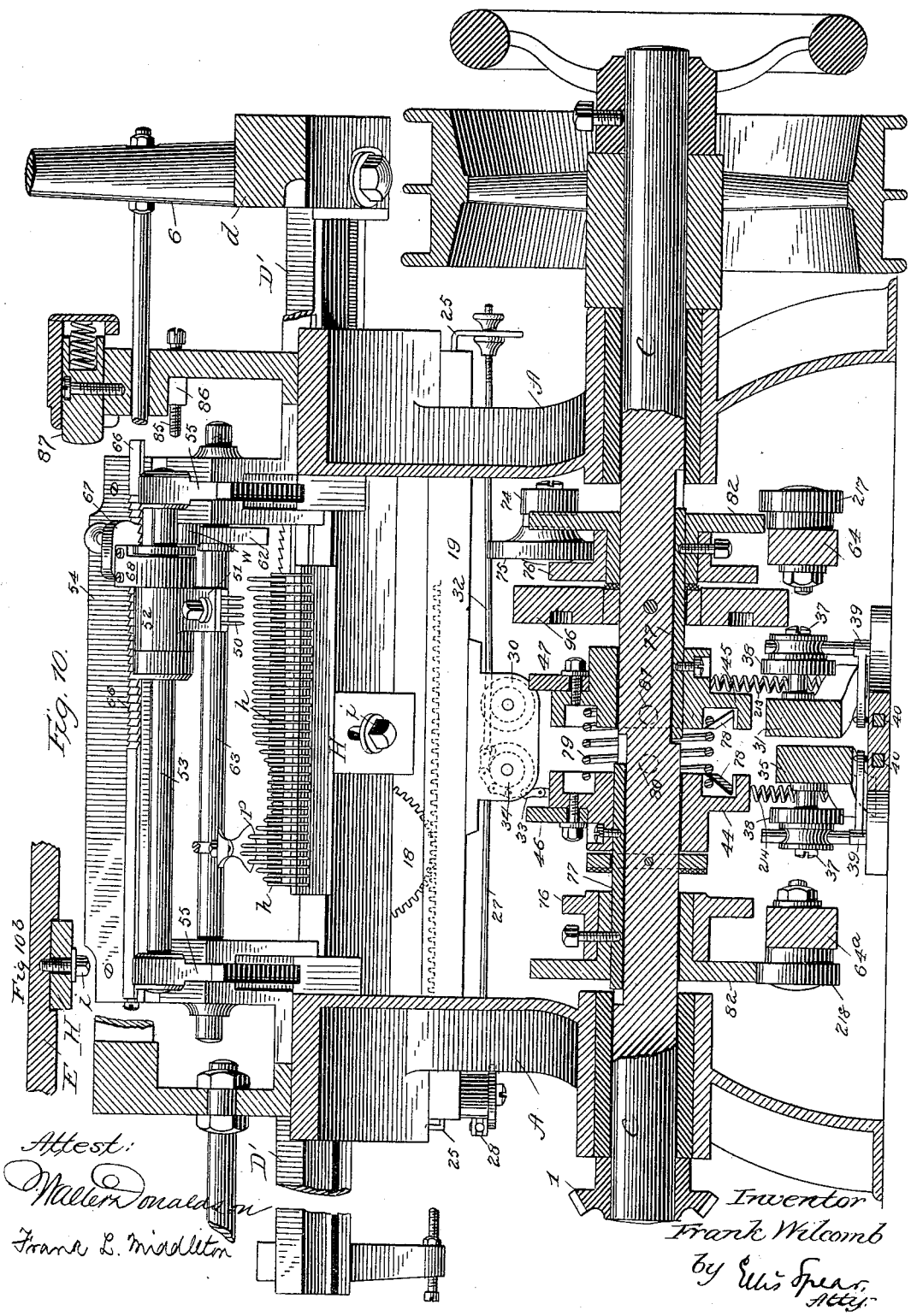

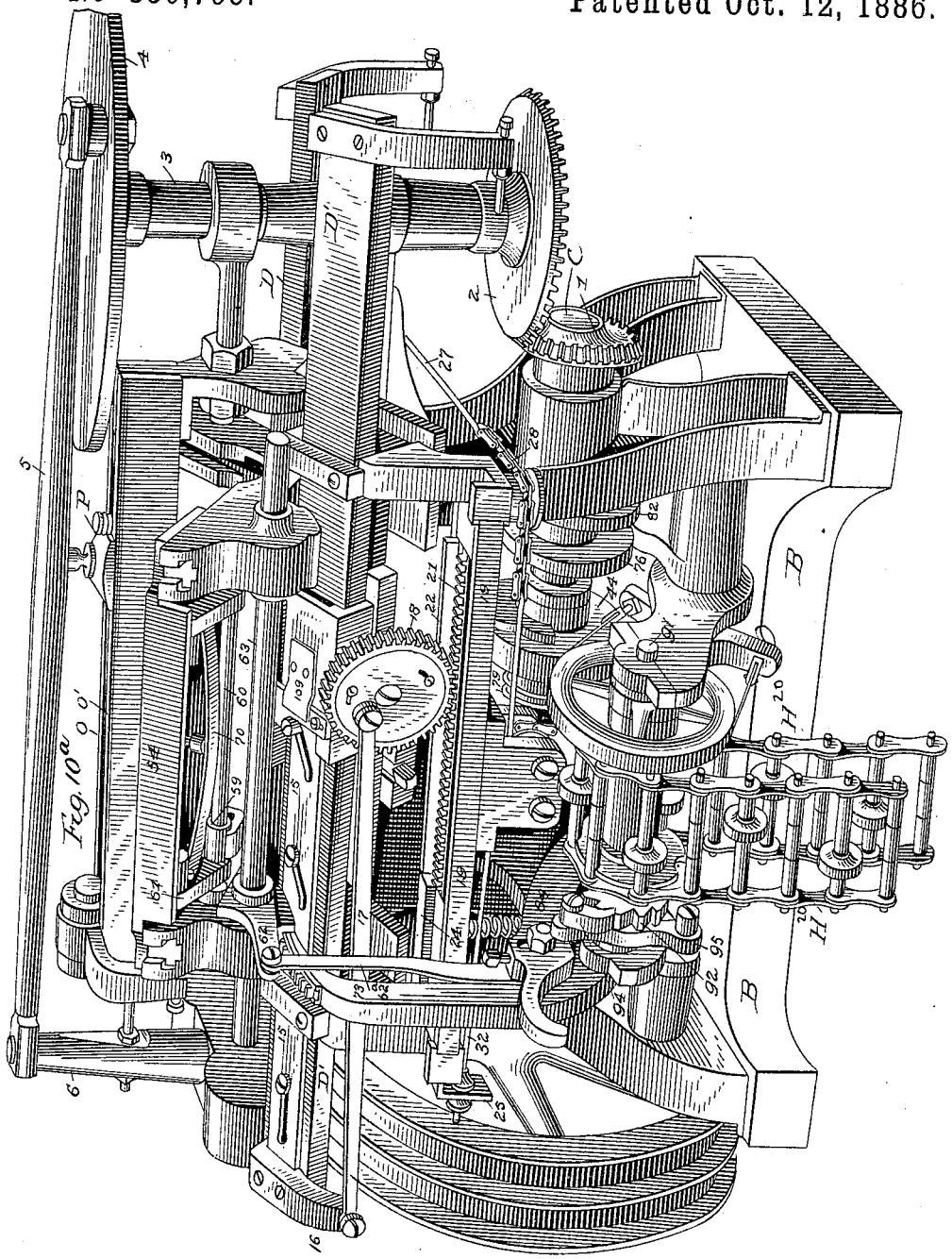

(No Model.)

F. WILCOMB.
STRAIGHT KNITTING MACHINE.

No. 350,795. Patented Oct. 12, 1886.

Attest:
Walter Donaldson
F. L. Middleton

Inventor
Frank Wilcomb
by Ellis Spear
Atty.

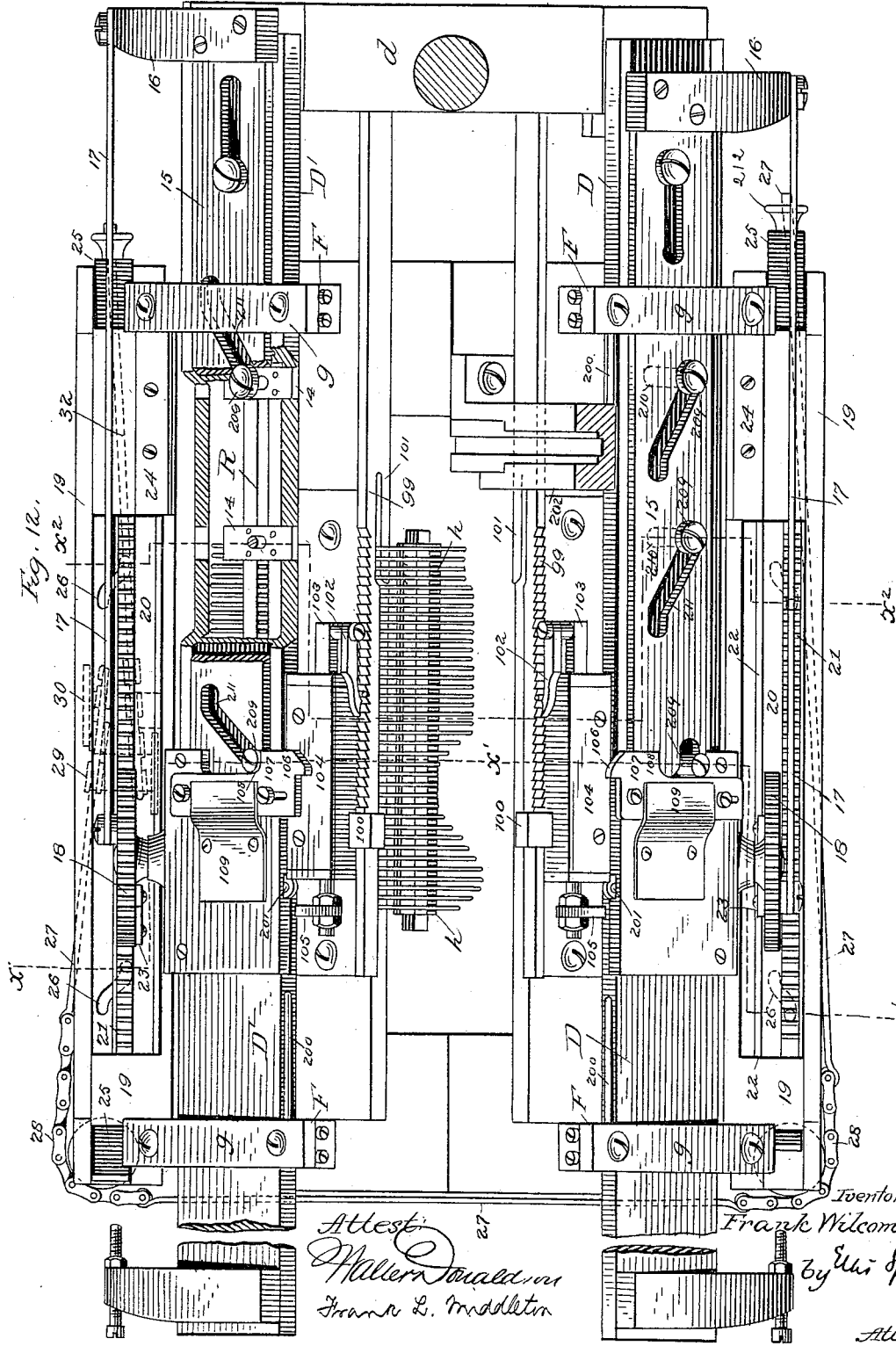

(No Model.)	14 Sheets—Sheet 8.
F. WILCOMB.
STRAIGHT KNITTING MACHINE.
No. 350,795.	Patented Oct. 12, 1886.
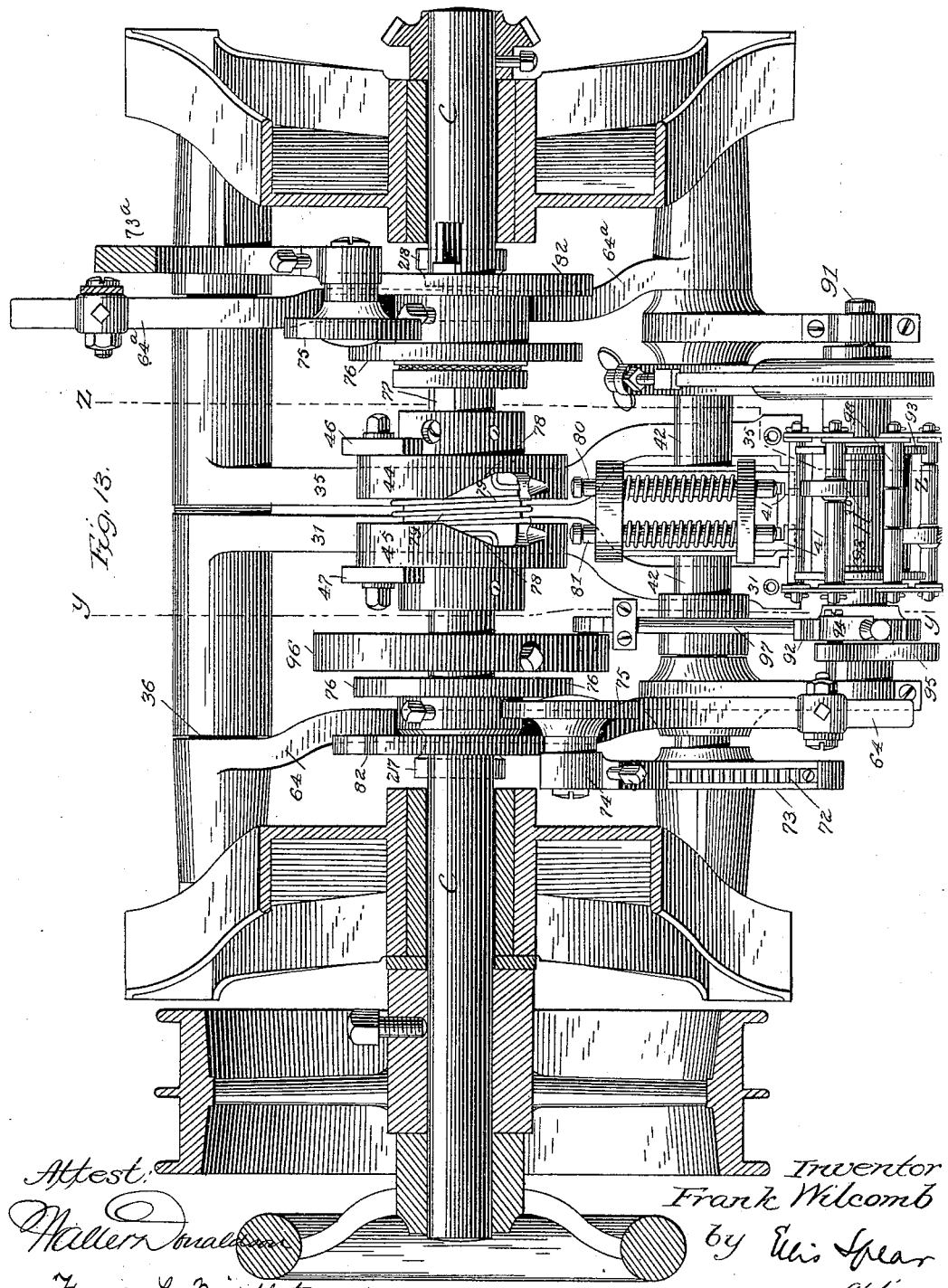
Attest:
Allen Donaldson
Frank L. Middleton
Inventor
Frank Wilcomb
by Ellis Spear
Atty.

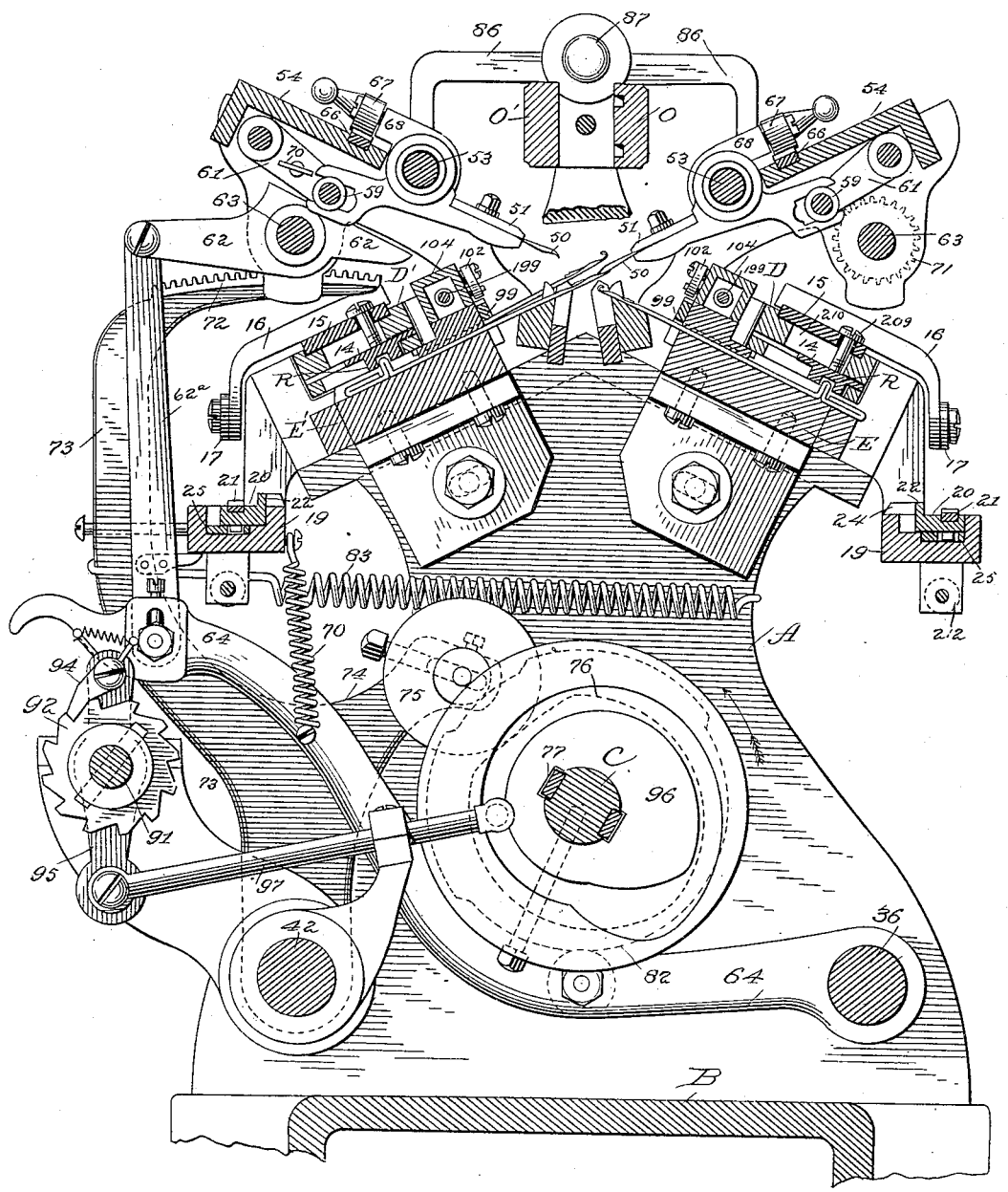

(No Model.) 14 Sheets—Sheet 10.
F. WILCOMB.
STRAIGHT KNITTING MACHINE.
No. 350,795. Patented Oct. 12, 1886.
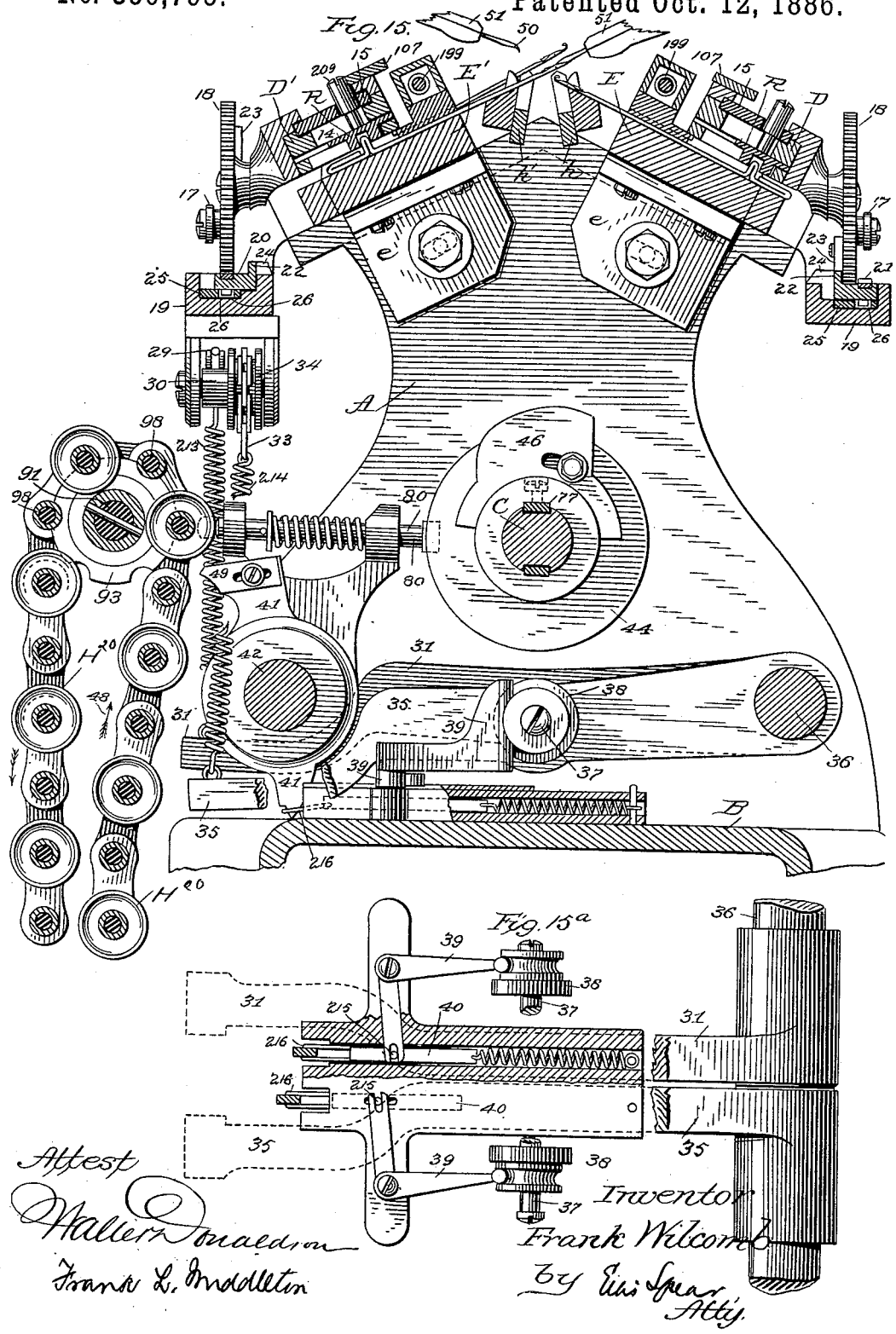
Attest
Waller Donaldson
Frank L. Middleton
Inventor
Frank Wilcomb
by Ellis Spear
Atty.

(No Model.) 14 Sheets—Sheet 11.
F. WILCOMB.
STRAIGHT KNITTING MACHINE.
No. 350,795. Patented Oct. 12, 1886.
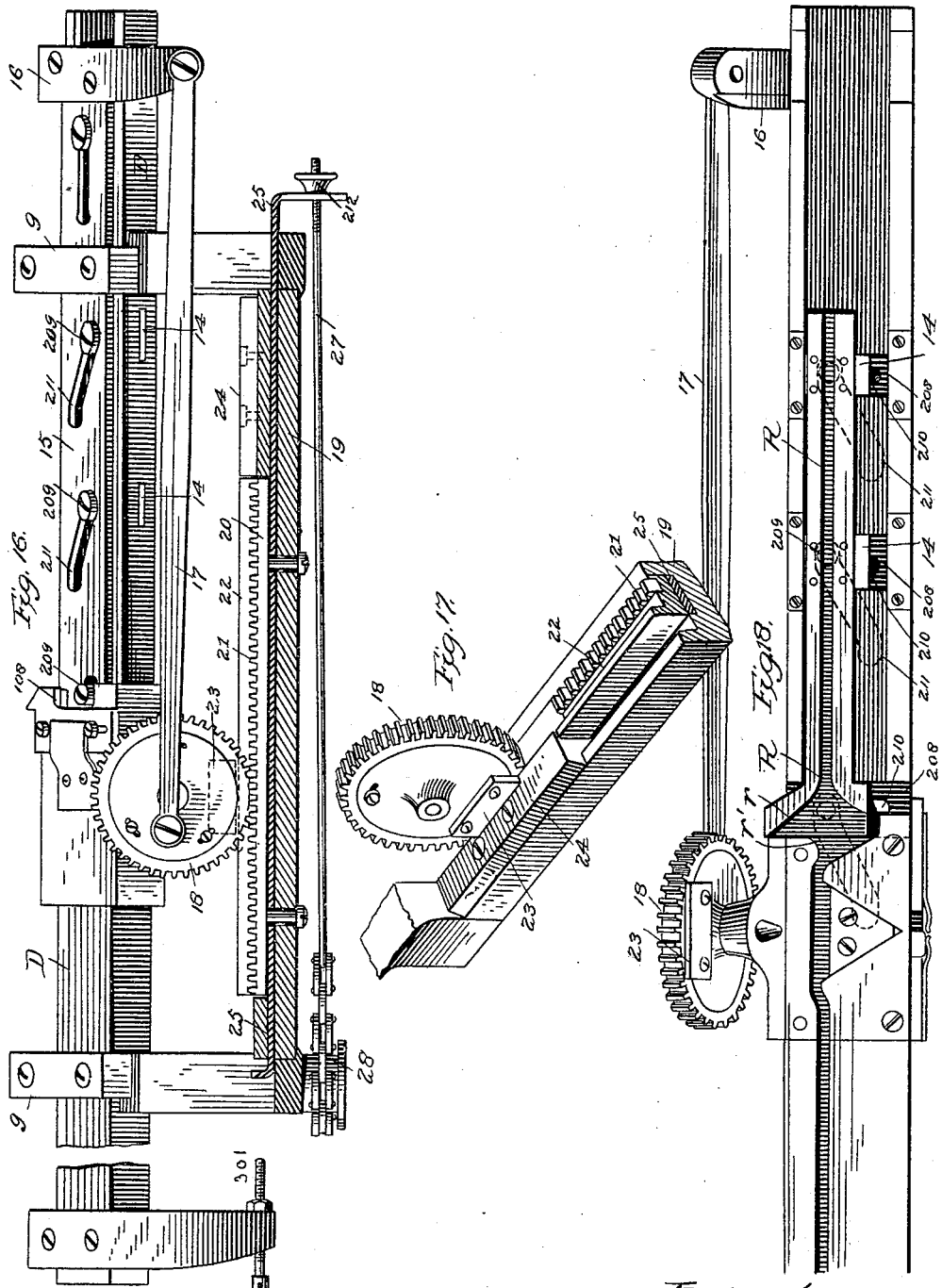

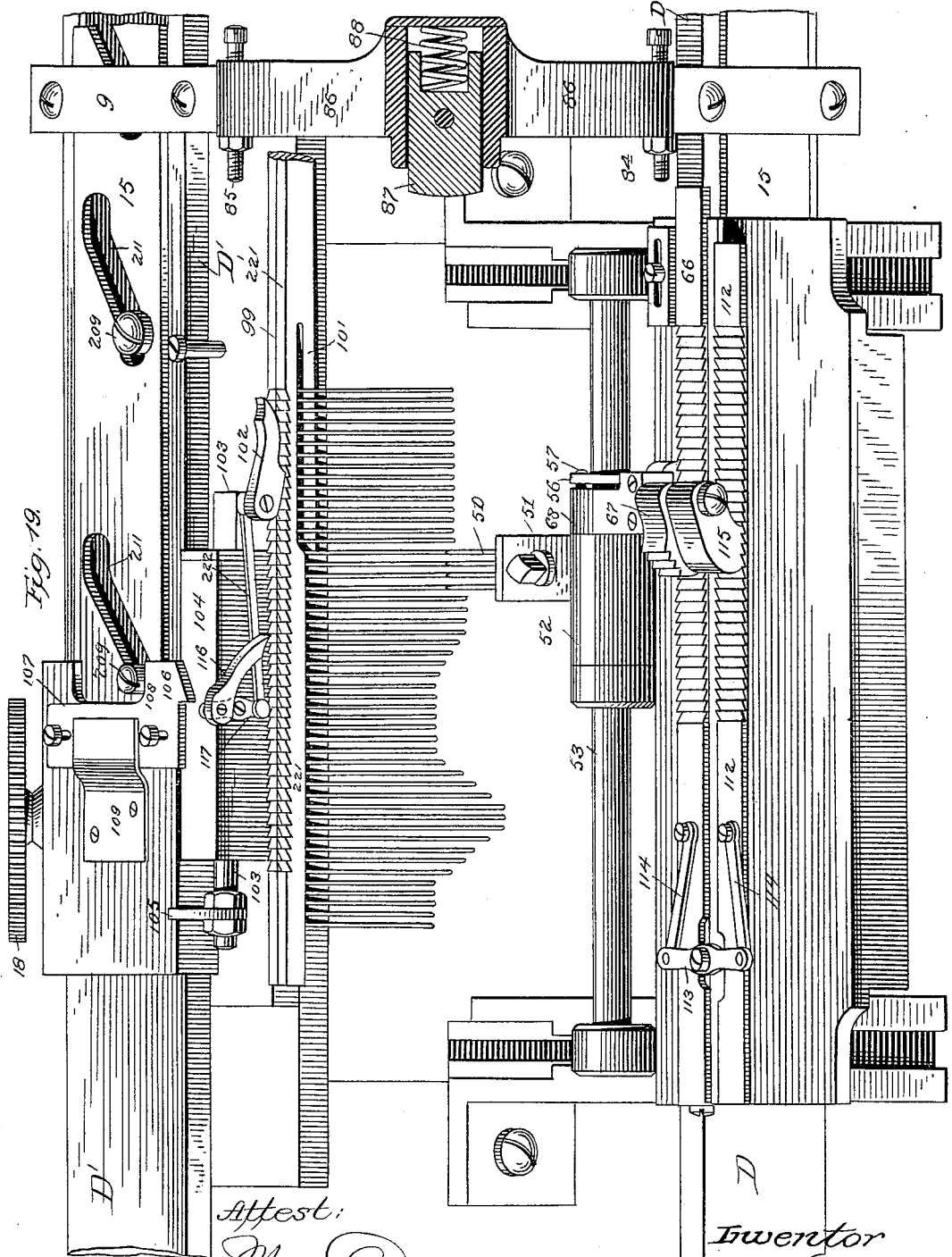

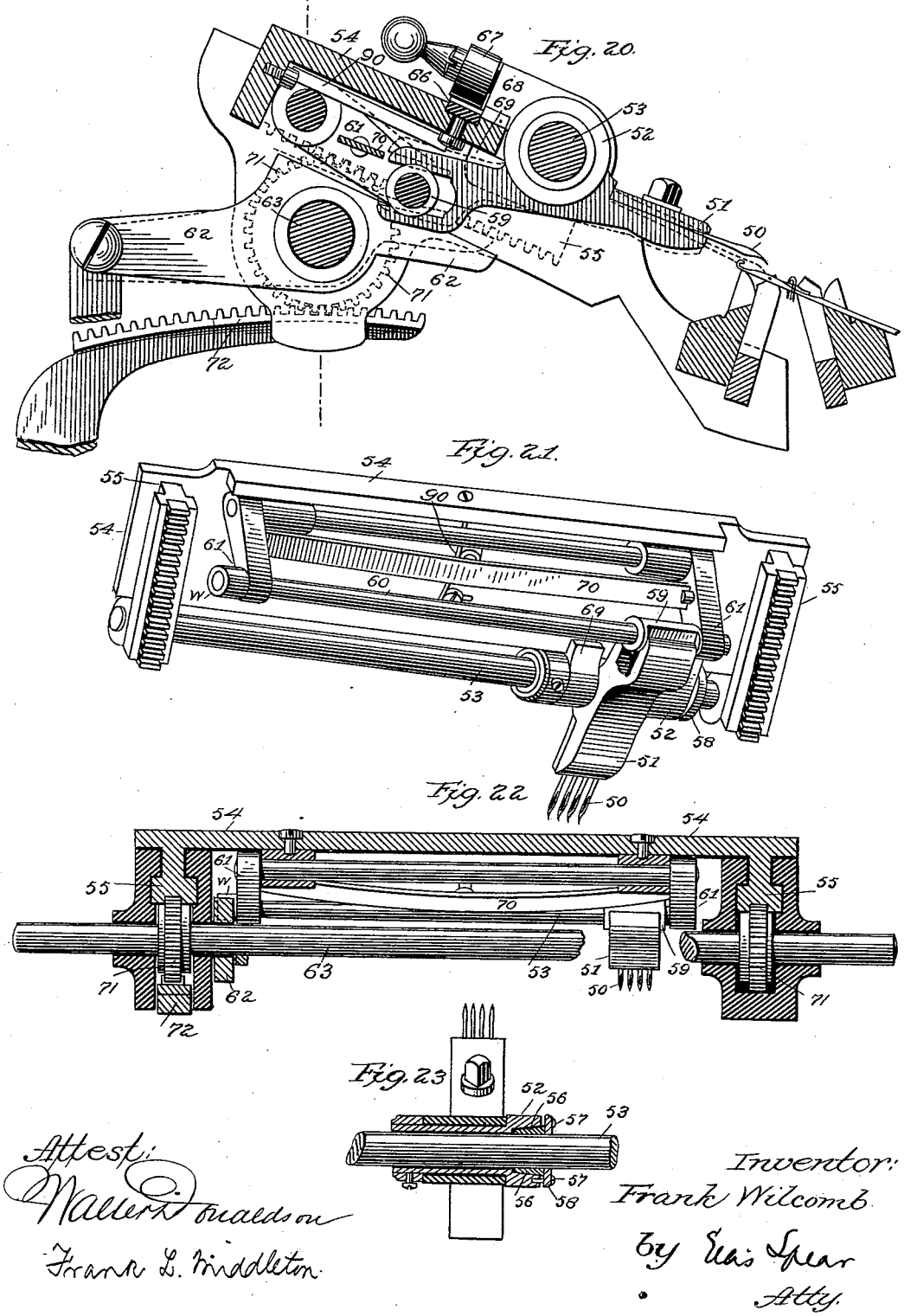

(No Model.) 14 Sheets—Sheet 14.

F. WILCOMB.
STRAIGHT KNITTING MACHINE.

No. 350,795. Patented Oct. 12, 1886.

Attest:
Walter Donaldson
Frank L. Middleton

Inventor
Frank Wilcomb
by Ellis Spear
Atty.

UNITED STATES PATENT OFFICE.

FRANK WILCOMB, OF SAN FRANCISCO, CALIFORNIA.

STRAIGHT-KNITTING MACHINE.

SPECIFICATION forming part of Letters Patent No. 350,795, dated October 12, 1886.

Application filed July 3, 1886. Serial No. 207,099. (No model.)

*To all whom it may concern:*

Be it known that I, FRANK WILCOMB, of San Francisco, in the county of San Francisco and State of California, have invented a new and useful Improvement in Straight-Knitting Machines; and I do hereby declare that the following is a full, clear, and exact description of the same.

My invention relates to knitting-machines of that class having straight parallel rows of needles, and which are adapted to knit either flat, ribbed, or tubular fabrics.

In the process of knitting on a straight tubular knitting-machine, as heretofore known, the process of narrowing has usually been performed by transferring the stitches from the needles by means of a transfer-comb or by means of an instrument held in the hand of the operator, and the empty needles are thrown out of action by hand. This mode of narrowing is effective; but it is necessarily slow, and requires skill and care, and cannot be used on the finer gages of needles, for the reason that the comb or transferring-instrument cannot be operated between such needles and their sinkers.

Tubular fabrics have heretofore been shaped by beginning at the smaller end of the tubular fabric and widening as the work advances by bringing into action more needles; but this leaves holes in the fabric where the needles are introduced, and although an effort has been made to remedy this by using two threads knitted simultaneously on both rows of needles, crossing the threads at the ends of the rows, the remedy is only partial.

A machine has also been shown in which it is sought to narrow by automatically transferring the stitches at the ends of the straight rows of needles, and throwing out the needles from which the stitches have been transferred. In this machine the needles of the two straight rows are vertical and require cross-rows of needles at the ends between the two rows. I am not aware that a practically-operating machine of this kind has ever been made; but the transferring mechanism appears to be adapted only to needles of large size, and I am not aware that any machine having inclined parallel rows of needles has ever been constructed or devised in which the stitches are automatically transferred from needle to needle, in order to shape the tubular fabric.

Further, it may be stated that in machines for knitting flat fabrics—such as that shown in Letters Patent to Abel, reissued May 16, 1882, No. 10,112—the fabric has been shaped by the automatic transfer of the stitches, this transfer being accomplished by transfer-points, engaging with the needles, and by moving the loops from the needles to the transfer-points by means of movable sinker-bars, and the reverse; but it will be apparent that while this mode of operation is applicable to a machine for knitting flat fabrics, it cannot be used with a machine for knitting tubular fabrics, for the reason that if the stitches should be moved on the needles and transfer-points on one side, while the thread is held by the needles of the opposite row, the thread would be broken where it crosses from one row of needles to the opposite.

My invention includes a straight latch-needle knitting-machine, with shaping mechanism for operating the points and needles in unison, and to transfer stitches without motion of the loops lengthwise on the points and needles, all driven by the same power or shaft and timed by pattern mechanism. It includes a construction and organization of machine by which a tubular fabric may be shaped by transfer of stitches on a straight-latch-needle machine; and, further, an organization by means of which the transfer on such needles may be concurrent with the knitting; points of novelty existing in the mechanism for imparting forward and backward movement to the needles and points, in the mechanism for laterally moving the points, and in the general organization of the machine to produce these movements.

The general organization of the stitch-transferring mechanism, in connection with the machine, relates principally to a straight-latch-needle knitting-machine having two rows of needles; but parts of the organization and many of the details are not so limited in their application.

My invention also includes in one machine both widening and narrowing mechanism or a stitch-transferring mechanism adapted to operate in either direction at the will of the operator. It includes, in connection with two parallel rows of needles, a shaping mechanism on each side adapted to be operated by the driving power of the machine, but independently of each other; and the invention includes various constructions and combinations relating to the general features. It also includes a special construction of thread guide and carrier.

All the points of general organization and detail are explained in connection with the accompanying drawings, and are specified in the claims.

Figures 24, 25, 26, 27, 28, 29:
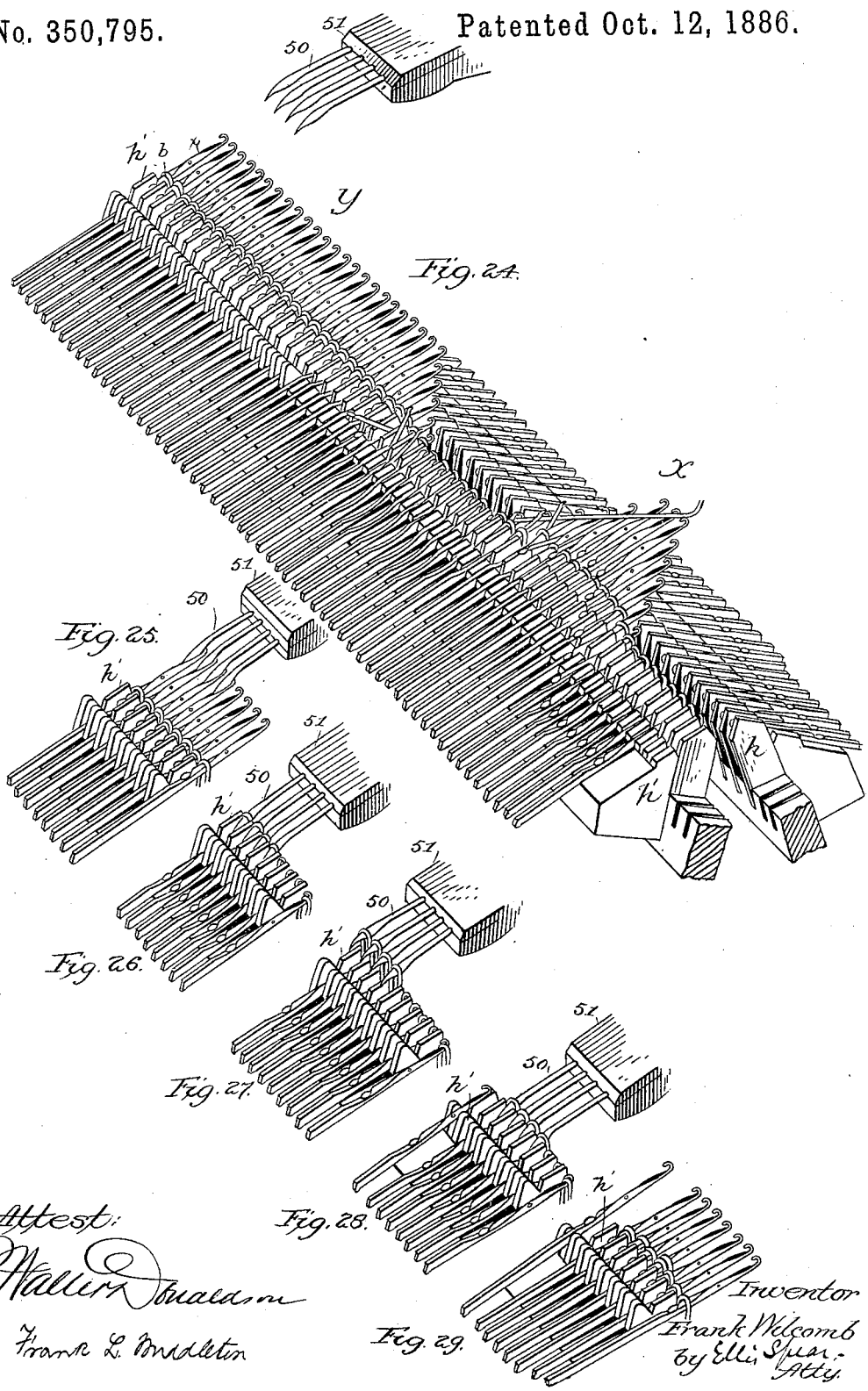

In the accompanying drawings, Figure 1 is a front perspective of my knitting-machine without the shaping attachments. Fig. 1$^a$ represents a bottom view of the connection between the cross-bar $d$ and slide-bar D. Fig. 2 is a cross-section through the center of Fig. 1. Fig. 2$^a$ shows detached in the same section the needle-cams, slide-bar, and adjacent parts. Figs. 3 and 4 show details of the switch-cams. Figs. 5 and 7 show views in transverse section of the thread carrier and guide in different positions, Fig. 5 showing also needles with a section of the needle-operating mechanism, all in their relation to the thread-guide, and Fig. 7 shows also needles in their relation to the thread-guide. Fig. 6 represents the thread carrier and guide in side elevation with the ends of the needles in proper relation to the guide. Fig. 8 shows the face of the guideway for the carrier and the cam-path therein. Fig. 9 is a perspective view showing the relation of the thread-carrier to the needles. Fig. 10 represents the complete machine with shaping attachments mainly in longitudinal section. Fig. 10$^a$ represents a perspective view of the entire machine, the view being taken from the rear thereof. Fig. 10$^b$ is a section showing how the sinker-bar frame is attached to the needle-bed. Fig. 11 shows the machine in plan view, the thread-carrier, its supporting and actuating devices, and the transferring devices on one side being removed, and it illustrates the needle-raising mechanism. Fig. 12 represents a plan view of the machine, part of the slide-bar being broken away, with the thread-carrier and the supporting and actuating devices therefor removed, and it illustrates in part the mechanism for moving the needles to transfer-loops. Fig. 13 shows a longitudinal section through the main shaft-bearings, showing the shaft, its cams, the levers operated by the cams, and the pattern mechanism. Fig. 14 shows a transverse vertical section of the machine, its lower part on line $y\ y$ of Fig. 13 looking from point 1 on the right of the figure, and its upper part on line $x^2\ x^2$ of Fig. 12. Fig. 15 shows a section of the machine taken transversely and vertically, its lower part on line $z\ z$ of Fig. 13 looking from point 1 on the right of the figure, and its upper part on line $x'\ x'$ of Fig. 12. Fig. 15$^a$ is a sectional detail view showing the mechanism for throwing the slide-rack into gear with the gearwheel to advance the needles in narrowing. Fig. 16 represents a side elevation of part of the machine, showing the mechanism for moving the grooved cams that operate the needles to transfer stitches. Fig. 17 is a detail of Fig. 16. Fig. 18 is a plan view of the under side of the slide-bar, showing the elongated grooved cam. Fig. 19 is a plan view, partly in section, showing parts of the mechanism for giving lateral movement to the points for either widening or narrowing, and also mechanism for throwing the needles into or out of work. Figs. 20, 21, 22, and 23 illustrate details relating to the points and point-carrying mechanism. Fig. 24 shows in perspective the needles and sinker-bars, and illustrates at X the operation of the needles in knitting, and at Y the advance of the needles for operation in connection with the transferring-points. Figs. 25, 26, 27, 28, and 29 show the movements of the needles and points in their order.

The machine hereinafter described is adapted to be used for two purposes—that is to say, omitting the narrowing mechanism it may be used as a plain knitting-machine, the narrowing mechanism being detachable from the machine.

Figs. 1, 2, 3, 4, 5, 6, 7, and 8 represent the machine when used as a plain knitting-machine, and the other figures represent the machine combined with the narrowing mechanism.

In these drawings, A represents the frame of the machine supported upon a bed, B. In this frame, in suitable bearings, is the main driving-shaft C, having upon one end a pulley, to which the power is applied, and upon the other end a beveled gear, 1, meshing with another beveled gear, 2, on a vertical shaft, 3, the bearings of which are also connected to the frame of the machine. The beveled gear 1 has exactly one-half the number of teeth of the beveled gear 2.

On the upper end of the shaft 3 is the face-plate 4, to which is attached the ordinary arm, 5, which operates the slide-bars D D'. These slide-bars are connected to each other by a cross-bar, $d$, to which is attached a spindle or post, 6, to the upper end of which the connecting-rod 5 is pivoted.

The connection between the slide-bars D D' and the cross-bar $d$ is shown clearly in detailed Fig. 1$^a$. The cross-bar has raised parts, as shown in Fig. 1, and the ends of the slide-bars are fitted thereto. The cross bar is also provided with an elongated slot, $d^{41}$, through which a screw, $d^{42}$, passes into the slide-bar. By means of the slots adjustment is allowed, as hereinafter described. In the operation of the machine, this construction causes the slide-bars to reciprocate once across the machine in two revolutions of the main shaft.

The needle-beds are arranged in relation to each other in substantially the same manner as in the ordinary Lamb knitting-machine, and they are shown at E E'; but they differ from the machines of this class heretofore known in respect to the devices for giving a forward and backward adjustment on the frame of the machine for the purpose of setting the two rows of needles and needle-bars nearer to or farther from each other. This adjustability is accomplished by attaching the needle-beds to brackets e, which are connected to the end frames by means of set-screws f, which pass through slots in the brackets, and thus hold them adjustably to the frame. The bearings F of each slide-bar are attached to the end of the corresponding needle-bed, the sliding bar being held in its bearings by caps g, so that the slide-bar and the needle-bar are always held in the same relation to each other, whether the needle-bed be set forward or backward on the inclines of the frame. The sinker-bars are shown at h h'. These are attached to sinker-bar frames H H'. These frames are attached directly to the needle-beds E E', on the under side thereof, by means of set-screws i, which pass through transverse slots in the sinker-bar frames.

In order that the sinker-bars may be adjusted accurately, each of the sinker-bar frames, as at H, Fig. 10, is sunk into the under surface of the needle-bed, as shown in Fig. 10$^b$, and moves back and forth accurately parallel with the needles when it is adjusted backward and forward. The adjustment is effected after the set-screw i is loosened by means of a set-screw, I, which passes through an ear, k, on the rear end of the sinker-bar frame, and is threaded into the needle-bed. The ear is held to the set-screw by collars on each side of the ear, so that by turning the screw the sinker-bar frame is moved backward and forward, and is held in position when the screw is at rest.

The adjustment of the needle-beds first described is for the purpose of widening or narrowing the space between the hooks of the needles for adapting the machine to coarse or fine work, and also to regulate the length of thread at the ends of the rows of needles to correspond to the gage of the fabric. The adjustment of the sinker-bar is for the purpose of regulating the length of the loop or to compensate for the wear of the faces of the sinkers.

The slide-bars for plain knitting (shown in Figs. 3 and 4) are the same as those usually employed upon machines of this class. They have a groove, l, running lengthwise, fitted to receive the heels of the needles. The needle-cams are substantially the same in construction as those in common use in this class of machines. The V-shaped cam K is attached to the square plate 204 underneath the stitch-cams 205 and 206, and it has a forward and backward movement with this plate. It is moved by means of a stud, m, which projects upward through a transverse slot in the slide-bar (shown in dotted lines in Figs. 3 and 4) into an inclined slot in a plate, n, set into a recess in the upper face of the slide-bar. The plate n is moved in the ordinary way—that is, the stud 201 of plate n, Fig. 2$^a$, strikes the stop-pins 200 on the frame, Fig. 3—and in both slide-bars the plates n are the same, except that their inclined slots are placed reversely to each other, so that the grooves over one V-shaped cam is closed while the other is open.

My improved thread carrier and guide are shown in Figs. 5, 6, 7, and 8. The special construction of this improved carrier and guide is designed to adapt it for operation with improved results, both in connection with mechanism for knitting plain fabrics and also in connection with the mechanism for knitting shaped fabrics. It is a reversible carrier provided with a knife-edge, p, which is adapted to raise and hold open the latches, on whichever row of needles the carrier be operated. It is also adapted by the same construction, when used in connection with the narrowing and widening mechanism, to pass under the needles thrown out of use after narrowing. Along the top of the machine are fixed guide-bars O O'. Between these slides the thread-carrier P. This carrier has a vertically-arranged cavity extending from top to bottom. In upper and under plates, q q', are the bearings of the spindle Q, to the lower end of which is fixed the thread-guide 111. This spindle has a stud, 9, which projects into an inclined slot, 10, in a sleeve, 223, which sleeve surrounds the spindle and is adapted to move up and down in the cavity of the carrier. The sleeve is provided with a stud, 11, which projects laterally into a cam-path in the inner face of the guide-bar O. This cam-path is shown in Figs. 5, 7, and 8. It has a double path with inclines 12 and switches 13 at the ends. These ends of the path are located a little outside of the ends of the rows of needles, and when the carrier reaches the end of the straight part of the path or near the end of its stroke in either direction it strikes the incline 12, which forces the sleeve up or down, as the case may be, and thus gives the spindle a one-half turn, reversing the thread-guide. The sleeve is prevented from turning by the stud 11, passing through a vertical slot in the wall of the carrier.

The peculiar construction of the guide 111 is shown more clearly in Figs. 5 and 7; but as this special construction is shown and claimed by me in an application filed in the United States Patent Office on the 26th day of February, 1886, No. 193,319, its construction need not be here more fully explained, or further than is necessary to show its construction in connection with the reversing movement. It is attached to the lower end of the stem Q by means of a slotted arm held between nuts 207 on the stem, so that it may be accurately set both in respect to its height and lateral position in relation to the hooks of the needles, and when properly set it moves in the same relation to the needles in either direction. The thread-guide is adapted to move in the same relation to both rows of needles, its edge being fitted to open the latches of any of the needles on which the latches happen to be closed. For this purpose its symmetrical edge is exactly fitted, and the guide is so adjusted in relation to the needles that the curved edge p of the forward part passes under the projecting ends of the latches and lifts them from the hooks, the thread-guide, therefore, being of symmetrical shape and adapted to operate in the same manner upon the latches, whichever way it may be moving.

The second part of my invention relates to the mechanism for shaping the fabric. This mechanism is adapted to be attached to or removed from the machine, as above described, and to operate in connection with the needles and thread carrying and guiding mechanism, which have been heretofore explained. In the operation of the machine with these attachments for widening and narrowing, the operations of the parts above described are not interfered with, and the widening or narrowing is effected automatically through mechanism connected with the driving-shaft of the machine, and independently of and simultaneously with the ordinary operation of knitting. The first movement necessary in the operation of widening or narrowing is the forward movement of the needles from which the stitches are to be transferred. The mode of operation involved in the use of the mechanism, hereinafter explained, for transferring the stitches and widening or narrowing is the same as that presented in an application filed by me in the United States Patent Office on the 5th day of May, 1885, No. 164,455. In that application it is contemplated that the needles and transfer-points may be operated by hand. In the mechanism hereinafter described the same mode of operation is carried on automatically by mechanism connected with the main driving-shaft. The first movement necessary in the transfer of stitches in this machine, which has the ordinary latch-needle, is the forward movement of the needles from which the stitches are to be transferred. This movement is effected on each side of the machine by a supplemental elongated or transfer cam, R, placed in a cavity in the under part of the side bar. (Shown in Figs. 14, 15, and 18.) This cam has in it a straight longitudinal groove, which receives the heels of the needles. It extends from the stitch-cams in the center of the slide-bar toward the end as far as may be required. The end nearest the stitch-cams has a flaring open mouth (shown at r) to receive and guide the heels of the needles to the groove in whatever position the heels may be left by the stitch-cams. The stitch-cams are made with a corresponding open mouth, r', in order that they may receive the heels of the needles moving in an opposite direction from the supplementary or elongated grooved cam. The elongated grooved cams are attached to transverse guides 14, Figs. 16 and 18, which slide in transverse grooves 208 in the under surface of the slide-bar. Pins 209, set in these guides, project through transverse slots 210 in the slide-bar and engage with inclined slots 211 in the sliding plate 15, so that longitudinal movement of the plate 15 will shift the elongated grooved cam and the needles therein forward or back. In the present case this mechanism for moving forward the needles, just described, is shown only at one end of the slide-bar. This mechanism, including the elongated grooved cam, the sliding plate, and the connection between them, in combination with the slide-bar, all as above described, is shown and claimed in the application Serial No. 187,148, and is not claimed in this application. As shown in said application, it is adapted to be operated by hand.

In order to combine the mechanism in a perfectly automatic machine, I have devised means, as hereinafter explained, for giving the plate and the elongated grooved cam suitable movement, properly timed, from the main driving-shaft of the machine itself. Each sliding plate 15 is provided with an arm, 16, fixed to one end and extending laterally. This has a pitman-connection, 17, with a gear-wheel, 18, pivoted upon a cap-piece screwed fast to the slide-bar over the stitch-cams. The pitman is connected to the outer face of the wheel by a wrist-pin. The wheel 18 moves longitudinally over a bar, 19, which is attached to the bearing for the slide-bar, being thereby supported upon the needle-bed. The upper face of the bar 19 is formed with a broad longitudinal groove, in which is placed a shifting rack-bar, 20. The rack-bar is provided with a rack, 21, adapted to the teeth of cog-wheel 18. On the rear side of the shifting rack-bar is a vertical flange, 22, and between this flange and the rack 21 is a space sufficient to receive the wheel when out of engagement with the rack-bar. The wheel is thrown into engagement by shifting the rack-bar inwardly to engage the wheel, which takes place when the machine is at the utmost limit of its right-hand stroke. Reverse movement of the rack-bar brings it in the position shown on the right hand of Fig. 15, in which the wheel is off the rack-bar and slides over the smooth surface without turning. It is prevented from turning by means of a block, 23, fixed to the inner face of the wheel in such position that when the rack-bar is in the position indicated the block bears against the upper edge of the flange 22. The rack-supporting bar 19 has at the right-hand end of the machine a high part, 24, on a level with the top of the flange 22, and forming a continuation of the track for the sliding block 23, and when the wheel moves off from the top of the flange 22 it runs to the high part 24, which retains the wheel in the proper position and allows the track to be shifted. By these means the wheel at the end of each stroke is always held in the same position, and the same tooth, in its return movement, strikes into the end of the rack, so that the needles are always properly timed when the block is once set in its proper place. It will be understood that when the racks are both thrown out of engagement with the gear, the elongated cam is inactive, and only the ordinary stitch-cam is effective.

In order that the racks may be thrown into engagement with the gear at the proper time by the action of the machine itself, these racks are connected with a pattern-chain or equivalent mechanism. In the machine herein shown this connection is made as follows: In the rack-bar 19 in the longitudinal channel underneath the rack 20 is a sliding plate, 25, having inclined slots 26, as shown in Figs. 11 and 12. Into these inclined slots project pins set in the under face of the rack, so that as the plate 25 is shifted longitudinally, the rack is thrown into or out of engagement with the gear. As shown in Fig. 12, the construction of parts connected with the gears and racks is the same on both sides of the machine. On one side of the machine (the right hand of Fig. 14) the end of the plate 25 toward the right-hand end of machine in Fig. 12 is turned down, as shown in Figs. 10 and 16, and is connected by means of an adjusting-nut, 212, with the rod 27, which, by means of chains 28, is connected to other sections, 27, of the same rod round to the back side of the machine, as shown in Fig. 12, where a terminal chain, 29, passes over a roller, 30, and by means of a spring, 213, to compensate for any excess of movement, is connected to a lever, 31. The sliding plate 25 on the other side or back of the machine is connected to a rod, 32, the free end of which is connected directly to a chain, 33, which passes over a roller, 34, by the side of the roller 30, and is connected by an intermediate spring, 214, to a lever, 35, as shown in Figs. 10 and 15. The slots in the sliding plates 25 are so arranged in relation to the pins on the racks, and the connections above described are so adjusted that upon depression of either of the levers 31 or 35 one of the rack-bars is thrown into engagement with its gear. This depression of the levers 31 and 35 should take place only when the gear is at the extreme right-hand end of its movement, with its block 23 on the stationary part of its track 24, thus allowing the rack and the flange to change positions without interfering with the gear. The levers 31 and 35 are journaled on a girt, 36, in the front part of the frame, and extend across underneath the main shaft C. These levers 31 and 35 have attached to the outside of each. studs 37, projecting laterally, and on these are anti-friction wheels 38, which turn and slide freely on the studs, having a sliding movement equal to the thickness of the face of the wheel. They are moved by bell-crank levers 39, Fig. 15$^a$, pivoted to the frame, which is attached to the bed. One end of each bell-crank lever engages with a groove in the hub of each anti-friction wheel 36, acting as a shipper. The other ends of the bell-crank levers projecting inward toward each other, are slotted, and embrace pins 215, set in the upper surfaces of sliding bars 40. These slides are connected by links 216 to the free ends of levers 41, pivoted on a girt, 42, in the rear of the machine. The upper or free ends of these levers project into range with two rows of rollers on the pattern-chain H$^{20}$.

On the shaft C are two shifting-cams, hereinafter further explained. They are marked 44 and 45. To these cams are attached segmental cams 46 and 47. These segmental cams are in line with the rollers 38 when these are moved inward toward the levers, but pass by them without acting upon them when the anti-friction rollers are thrown outward. When these rollers are shifted inward toward the levers, the cams 46 and 47 in passing them depress the levers, and through the mechanism heretofore described, connected with the ends of the levers, operate the slides, which shift the racks and operate the grooved cams which act upon the needles, as above explained. The rack is thrown out of engagement when the push-pin 301, attached to the end of the slide-bar, strikes the turned-up end of the plate 25, Fig. 16, on the return-stroke of the slide-bar. The pattern-chain moves in the direction of the arrows 48, and as the proper wheel on this chain rises it strikes against the spur 49 on the upper end of the lever 41 and rocks the lever, setting in motion a train of mechanism, as above explained. The precise time when the spur 49 on the lever 41 is moved by the wheel on the pattern-chain need not be accurately determined, further than this, that it must operate to move in the wheel 38 before the high part of the cam 46 has reached it. The position of the cam 46 on the shaft determines the time of movement of the mechanism—that is, the time when the gear is thrown into action, which operates the elongated cam, and advances the needles—and this cam 46 is set upon the shaft, so as to depress the lever at the beginning of the return-stroke of the slide-bar from the right. The wheels upon the pattern-chain, which are adapted to come into contact with the spurs of the levers 41, determine the number of times that the wheels 35 on the levers are brought into range of the cams 46 47, and when these are once adjusted in the machine it works automatically to operate the needles in the manner explained.

After the needles have been advanced by the mechanism just described, the next movement in order, in the operation of the machine in shaping fabric, is the advance of the transfer-points. These points are of ordinary construction, and are adapted to cover the hooks of the needles to allow a loop to pass from one to the other. The points 50 are fixed to the end of a point-block, 51, which is mounted upon a sleeve, 52, which has longitudinal movement upon the guide-bar 53, which forms a part of the frame of the point-carrier. This point-carrier frame consists of a plate, 54, fixed to two transverse blocks, 55, and in these blocks also the guide-rod 53 is fixed. The point-block 51 may be moved longitudinally upon the guide rod without any lateral movement, or it may be swung laterally on the sleeve to cause the points to be depressed upon or raised from the needles. The sleeve, as shown in Fig. 23, has a leather packing, 56, fitting into the conical end of the sleeve and close about the guide-rod, the packing being forced into its seat by screws 57, passing through a collar, 58, into the end of the sleeve. This packing acts as a brake to prevent a too easy movement of the sleeve upon the rod. The point-block has a rearwardly-extending slotted arm, which embraces a chamfered thimble, 59. This thimble has free movement upon the guide-rod 60 of a swinging-frame, 61, arranged to the under side of the carrier-frame near the outer edge. When this guide-rod 60 is swung up toward the plate of the frame, it depresses the points and brings them into contact with the needles. This swinging movement is effected through an anti-friction roller, w, on the prolongation of the guide-rod 60. The roller w bears upon the straight face of a lever, 62, which is pivoted on the counter-shaft 63. One end of the lever 62 is connected by an intermediate link, 62ª, to a lever, 64, which is pivoted on the front girt, 36, and extends across underneath the main driving-shaft. The connection between the link 62ª and lever 64 is rendered adjustable by means of a bolt and slot, as shown. The lever is depressed by means of mechanism, hereinafter explained, and when depressed raises the inner or free end of the lever 62, which raises the swinging frame 61 and depresses the points, bringing them into engagement with the needles. This operation takes place without regard to the precise position of the roller w, provided it is within the fulcrum of the lever 62, which is always the case when the points require to be depressed to bring them into contact with the needles, as the whole point-carrier must be advanced for that purpose. It will be borne in mind that the sleeve upon which the point-block is pivoted is adapted to slide upon the rod of the point-carrier upon which it is placed. The chamfered thimble 59, which is embraced by the pronged end of the point-block, also slides freely upon the rod 60. This is for the purpose of permitting the necessary lateral movement for shifting the points from one needle to the next in transferring the loops. This movement is effected by means of a sliding rack, 66, Figs. 10, 11, 14, and 20, placed in the groove in the upper surface of the plate of the point-carrier, and having lateral movement sufficient to give proper movement to the point-block. This movement is communicated to the point-block by means of a pawl, 67, which is pivoted upon an arm, 68, of the sleeve 52, which carries the point-block. In order to prevent the arm 68 from rising when the sliding rack acts upon the pawl, a spur, 69, (see Fig. 21,) is provided on the sleeve, and is arranged to project underneath the inner edge of the carrier-plate, and thus prevents the sleeve from rocking. The pawl 67 is provided with a knob, by means of which it may be turned over, so that the smooth back of the pawl will rest upon the rack whenever it is desired to throw it out of engagement. The lever 62 operates only to depress the points and to hold them in engagement with the needles. When the lever is released, the frame is again depressed to raise the points by means of a spring, 70. The sliding rack is operated only when the points are at the limit of their forward movement and after they have removed the stitch from the needle. The mechanism for operating the sliding rack is described hereinafter in connection with the mechanism for giving the forward movement to the point-carrier. The transverse blocks 55, on the under side of the carrier, are provided with rack-bars, and these blocks slide in guideways attached to the frame of the machine, as shown in Figs. 10, 11, and 22. These guideways are in a plane parallel with the plane of the needles, and carry the points accurately in line with the needles when the points are depressed. The rack-bars engage with pinions 71 on the counter-shaft 63, and, by the rotation of this shaft, the point-carrier is moved backward and forward in direct line with the needles. This movement is imparted to the shaft 63 by means of a curved rack, 72, carried upon the upper end of a lever, 73, which is pivoted to the girt 42 of the machine. The lever 73 has an arm, 74, projecting inwardly, this arm carrying an anti-friction roller, 75, held adjustable by slot, set-screws, and bolt, as shown in Fig. 14, in the end of the arm in a plane at right angles to the main shaft C, in position to be brought into contact with a cam, 76, on the main driving-shaft, as shown in Figs. 10, 13, and 14. It should be borne in mind that Fig. 14 shows in side elevation one of the levers 73, as above described, the other being on the other side of the machine and at the opposite end of the frame, as shown in Figs. 11 and 13. It will be observed that when the arm 74 is raised and the lever 73 thrown outward, the pinions cause the point-carrier to move inward. The cam which operates the lever 73 is shown at 76. It is attached to a movable spline, 77, on the main shaft C. This spline has a longitudinal movement on the shaft sufficient to carry the cam 76 from the position shown in Fig. 13 into line with the roller 75, this roller being, as shown in Fig. 13, a little to one side of the cam on the main shaft. The operation of the machine requires that this cam should be shifted into line with the roller 75 in time to operate the point-carrier, in order to bring the points forward to the needles from which the loops are to be transferred immediately after those needles have been advanced. The mechanism for giving this timely movement is shown in Figs. 10, 13, and 15. On the inner end of the spline is fixed a switch-cam, 45, the inner face of which is cut away to form an inclined or cam face, as shown at 78. The switch-cam is normally held in the position in which it is shown in Fig. 13, by means of a spiral spring, 79, wound around the inner hubs of the switch-cams, and at its ends connected to the two cams, holding them both in position, as shown. Mounted in bearings supported on the girt 42 are switch-pins 80 and 81, normally held away from the face of the switch-cams 44 and 45 by springs coiled about them. They are pushed forward by the pattern-chain, the rollers of this chain being adapted to push the pins according to the pattern of the fabric to be shaped. When the switch-pin 81, for example, is thus pushed forward through the opening 78 in the inner face of the cam 45, it rides up the incline of that face and forces the cam with the spline and the cam 76 to the right of the machine (left in Fig. 13) and brings it into line with the roller 75. The operation of the parts is so timed that this lateral movement of the switch cam and the cam 76 takes place when the low part of the cam 76 is opposite the roller 75, this permitting the lateral movement of the cam 76 and bringing it into position for immediate action by the rotation of the shaft C, and, as before explained, this operation is timed to take place immediately after the advance of the needles. The depression of the points which immediately follows their advance is also effected by the same lateral movement of the switch-cams above described. This lateral movement, which carries the cam 76 into range with the roller 75, at the same time carries the cam 82, also fixed to the spline, as shown in Fig. 10, into range with the roller 217 of the lever 64, the depression of which gives the downward movement to the points to bring them into engagement with the needles. The cam 82 is so set upon the spline that the action thereof upon its appropriate roller immediately follows the action of the cam 76.

In the above description of parts attention has been directed to the right-hand half of the point-moving mechanism. (Shown in Fig. 10.) This operates the point mechanism on the rear of the machine, while the needles are advanced upon the front of the machine for the transfer of stitches. The lever 64ᵃ on the left-hand side of Fig. 10 operates the point mechanism on the front of the machine, and is shown with the cam 82, which depresses the lever in engagement with the roller 218 thereof. This cam 82 is connected to a spline, 77, which also carries a point switch cam, 44, in construction and operation precisely like the cam 45, heretofore described, and the cam 44 is operated by a switch-pin, 80, precisely as described in connection with the pin 81. The mechanism just described, whereby movement at proper time is given either to the lever 64 or 64ᵃ and levers 73, imparts through these levers the positive forward and downward movement to the points, and holds these points in their proper relation to the needles as long as required for the operation of transferring the loop. The upward and backward movement of the points, which takes place in the order named, is accomplished by springs 70 and 83, Figs. 14 and 21, the former raising the points and the latter drawing them back as soon as the high parts of the cams heretofore described pass the rollers on which they bear, and these high parts are timed to release the levers and allow the springs to act as soon as the transfer of stitches has been effected. It will be borne in mind that the depression of the points to engage with the needles described above, as taking place after the forward movement of the points has begun, occurs before the completion of the forward movement of the points and at the precise moment when the points have reached the proper position over the hooks of the needles, as shown in Fig. 20, and the further forward movement of the points, together with the backward movement of the needles, takes place after this engagement, and sufficiently to receive the loops on the points from the needles. The forward movement of the needles is caused by one half-revolution of the wheel 18, and the backward movement of the needles by the other half-revolution of the said wheel. It must also be borne in mind that the lateral movement of the points by which the loop received from the needle is transferred to another needle takes place after the points have reached their limit of forward movement, and after they are raised from the needle from which the loop is taken. This lateral movement is imparted to the points by a sliding rack on the point-carrier, as heretofore explained. The sliding racks are moved by push-pins 84 and 85, one on each side of the machine and set in the frame 86. This frame has a central socket, which fits over a projection, 87, fixed on the end of the guide-bars and in line with them. The frame has limited movement on its projection, and is held normally out by a spring, 88, between the end of the projection and a cap on the outer end of the socket. The push-pins are set so as to be in line with the sliding racks 66 when the point-carrier is at the extreme forward limit of its movement. The frame 86 is moved inward to carry the push-pins when the slide-bars are very near the extreme limit of their forward movement by means of the post 6, set upon the cross-piece d, which connects the slide-bars in line with the cap of the frame-socket, against which it strikes. Thus both pins are operated at each—that is, from right to left—movement of the slide-bars, but only one acts at a time upon the sliding rack of a point-carrier. The spring 88 returns the frame as soon as the slide-bars commence their backward—that is, from left to right—movement, and the slide-rack is returned when the pressure of the push-pins is removed from it by a flat spring, 90, fixed to the under side of the plate of the point-carrier. (See Fig. 20.) The push-pins are adjusted so as to move the sliding rack a distance exactly equal to the distance from needle to needle.

It will be remembered that the beveled gear on the shaft C has been described as having one-half the number of teeth of the beveled gear 2, by which motion is transmitted to the slide-bars. There is, therefore, one complete revolution of the cams, heretofore described, which operate the narrowing mechanisms, during each stroke of the slide-bars. The cams are timed to commence operation at about the middle of the forward stroke of the slide-bars, so that the movements of the knitting mechanism are completed in advance of the stitch-transferring mechanism, and the two operations are therefore carried on simultaneously without interfering with each other. It will be noticed that in the machine as constructed the stitch is removed from the needle during the latter half of the forward stroke, and the points are operated backward, and the needles projected forward in unison during the first half of the return stroke—that is to say, the cams which operate the transferring mechanism commence their operation at the middle of the forward stroke and complete it at the middle of the return stroke, so that there is one operation of the stitch-transferring mechanism in one reciprocation of the slide-bars and thread-carrier. It will be borne in mind that the point-operating mechanism is all moved to transfer the stitches by the cams on the main shaft, and that these cams are set upon the main shaft to operate invariably in their proper time in relation to the other movements of the machine, and they operate invariably in this proper order whenever brought into range with the levers, and that the times when they are brought into range with the levers is regulated by the rollers on the pattern-chain H²⁰.

It will be apparent that any suitable pattern mechanism may be used acting on the general principle of a pattern-chain to move the switch-cams or mechanisms which control the needles in the stitch-transferring operation; but I have shown a pattern-chain, and this is in practice sufficient for the purpose. The chain, with its carrying-wheels 93, is mounted on the shaft 91, mounted in standards supported in the frame, and is adapted, by raising the pawl 94, to be thrown out of gear with the driving-power, to cease shaping, at the will of the operator. The carrying-wheels are fixed to this shaft, and the shaft has fast upon it a ratchet-wheel, 92. This ratchet-wheel is provided with twelve teeth. This number is not material, but is proportionate to the number of notches in the carrying-wheels, 93, which in this case number six. The ratchet is moved by the pawl 94, carried upon a lever, 95, which is operated by a cam-groove in the face of the driving-cam 96, rigidly attached to the main shaft C, the motion being communicated through a rod, 97. The ratchet-wheel and its shaft are therefore moved one notch by each revolution of the main shaft C. This moves the pattern-chain through a space equal to one-half the distance between the bars 98 of the chain. Each push-pin has its own row of rollers upon these bars of the chain. In the arrangement shown the rollers are set on alternate bars, and of those one half, alternating, are arranged in line with one push-pin and the other half in line with the other, but manifestly the whole arrangement can be changed according to the pattern required, the same general principle of arrangement being observed. It is equally obvious that the details of construction of the cam mechanism on the main shaft may be varied, as well as the details of construction of the pattern mechanism, the general principle of this part of the invention requiring only that mechanism operated by the main shaft of the machine to move the stitch-transferring mechanism shall be controlled by a suitable pattern mechanism.

The mechanism for rendering the empty needles inoperative is shown sufficiently in Figs. 9, 11, 12, 14, and 19. Attached to the cap-piece of the needle bed, and on the inner face thereof, is a needle-raising slide, 99. It is held in place by clips 100, which guide it accurately in its movement longitudinally of the needle-bed. The principal part of it lies over the needles and serves as a cap-piece to hold the needles down, as shown clearly in said figures. These figures also show toward the right-hand end of the rows of needles a finger, 101, forming a path for the needles parallel with but a little above the guiding-face, the main part of which has been described as being arranged above the rows of needles. The finger 101 is beveled down at the end so as to pass under the needles when the needle-raising slide is moved to the left. This movement toward the left is effected by means of a pawl, 102, carried upon a sliding bar, 103. This sliding bar passes through a casing, 104, on the top of the needle cap-piece, and the other end, projecting beyond the casing, has an adjustable lug, 105. The lug 105 is in range with a spur, 106, on a sliding plate, 107, carried upon the cap-piece of the sliding bar. The plate 107 has a limited movement across the slide-bar, and is operated by one of the screws 209 in the elongated grooved cam R of the slide-bar D or D′, as the case may be, as there is one on each side. This projecting screw strikes a shoulder on the plate at 108, Fig. 12, as the elongated grooved cam advances and moves the plate, bringing the spur 106 into range with the lug 105, and the plate is held in this position removably by the friction of the clamping-spring 109. The spur 106 being in this advanced position, the forward movement of the slide-bar will bring it into contact with the lug 105, and this lug is accurately adjusted, so that the completion of the movement of the slide-bar after the lug is struck by the spur will move the needle-raising slide sufficiently to raise one needle. As the spur recedes, a spring, 199, around the sliding bar and within the casing 104, throws the pawl back to its normal position, leaving the pawl in engagement with the teeth for the repetition of the movement. The needle-raising bar slides in frictional contact in its bearings in the clips, and remains in the position to which it is moved by the pawl, and each successive movement of the elongated grooved cam moves forward the plate 107 to repeat the movement of the needle-raising bar, and thus successively raises the needles as the stitches are removed from them. The rear face of the spur 106 is inclined, and in the forward movement of the slide-bar it is pushed down by contact with the bracket 202, Fig. 12, or with any suitable projection on the frame. The needle-raising bar may be set in any suitable position at the commencement of the work, and serves to raise the needles and hold them out of work for any desired width of fabric. As shown in Fig. 12, the needle-raising mechanism on both sides of the machine is precisely the same.
The thread-guide has been heretofore described in connection with the needle-latches. Its construction and the arrangement of its parts in relation to the needles raised out of work are shown more clearly in Figs. 5 and 9.
The guide is formed with a curve from its shank to its edge, the curve being of sufficient capacity to allow the guide to pass under the raised needles and past their ends, whether upon the forward or return stroke. The thread shown at 110 passes down on the back of the guide through a tunnel, 220, in the guide, having an outlet just underneath the beak and in rear of the edge, as shown at 111 in Fig. 5. This figure also shows the position of the beak in passing under the raised needles and over the needles in their normal position.

The mechanism heretofore described for transferring the stitches, as represented, is adapted only to narrowing; but the same mechanism and the same movements, with a very slight change, are equally adapted to widening the fabric by transfer of stitches. The mechanism for this transfer of stitches for the purpose of widening is shown in Fig. 19. The only change required is the provision of an additional slide-rack and pawl and suitable means for connecting it with the rack 66, as shown in Fig. 19. In the upper surface of the plate of the point-carrier is a second sliding rack, 112, parallel with the rack 66. It is connected to the rack 66 by means of a yoke, 113, pivoted to the plate between the racks and connected to the slide-racks by links 114. The slide-rack 66 projects, as heretofore described, so as to be acted upon by the push-pins, and movement of the rack 66, thereby effected, moves the rack 112 in the opposite direction exactly the same distance. The teeth in the rack 112 are set in a direction opposite to that of the teeth of the rack 66. On the same pin which holds the pawl 67 is set reversely to pawl 67 a pawl, 115. The figure shows the pawl 67 as reversed and thrown out of action while the pawl 115 is in engagement with its rack, and the machine is therefore adapted for widening. The only difference in the operation of the machine so set is that the transfer-points, after getting possession of the loop, move to the right instead of to the left.
Only one side of the machine is shown as provided with these double racks; but it will be understood that the construction is precisely the same for both sides of the machine. The operation of widening also requires reverse movement of the mechanism by which the needles are thrown out of work, in order that in widening the needles may be thrown into work as they are required. The change made in this part of the mechanism is also shown in Fig. 19. The slide which carries the finger 101 is provided with an additional rack, 221, with the teeth set in the direction opposite to that heretofore described. The pawl 102, above explained, is shown in this figure as thrown out of engagement, and a second pawl, 116, is provided for engagement with the second rack, and is adapted to move the needle-raising finger in the opposite direction. In order that this opposite movement may be given by the same movement of the plate 107, the pawl 116 is attached to a lever, 117, pivoted on the casing 104, and connected by a link, 222, to the pin of the pawl 102. The arms of the lever 117 are equal in length and precisely the same amount of movement is imparted to the slide-rack by this pawl as by the other, but in an opposite direction, and each movement effected by the pawl 116 allows a needle-drop to come into work.

The widening and narrowing mechanism above described is equally well adapted to the machine when arranged to knit ribbed fabric, and no other change is needed in the machine herein shown in order that it may be adapted to knit ribbed fabric except the substitution of V shaped cams having the grooves at the base of the V-shaped cam on one side of the machine somewhat wider apart than those at the base of the corresponding cam on the other side of the machine, so that both rows of needles shall not draw the stitch exactly at the same time; but as this form of cam is well known for the purpose, and is shown in the United States Patent to Aiken, No. 72,771, dated December 31, 1867, it need not be herein described. It is also necessary that the thread-guide should be prevented from reversing, so that it may always feed one row of needles. This is accomplished simply by removing the pin 11, which extends from the sleeve into the guide-rack.

The operation of the machine for knitting straight fabrics is of the ordinary character, and requires no explanation beyond that already given, relating to the adjustment of the needle-beds and sinker-bars.

The operation of the mechanism for widening and narrowing may be briefly stated. Supposing, for example, the work to be done upon the machine is the knitting of an ordinary stocking-leg, this would require that the tubular fabric should be knit straight, beginning at the top, down to the calf of the leg. For this purpose the part of the chain which passes the push-pins during the operation of knitting this part of the fabric is provided with plain bars without rollers, and the narrowing mechanism is not thrown into operation. As already stated, the pattern-chain makes two movements at every reciprocation of the slide-bar—that is, at every round of knitting—and each movement takes place when the knitting-cams are in their central position. As the slide-bars approach the right and the stitch-cams reach their central position, the chain makes a forward movement and brings a roller of the pattern-chain into engagement with the spur 49, which places the roller of the lever that operates the sliding rack 21 into range with its appropriate cam on the main shaft. Its cam strikes the roller of the lever at exactly the instant when the slide-bar reaches the limit of its extreme right-hand movement, and the lever is depressed at the beginning of the forward movement of the slide-bar. This shifts the rack-bar 20 on one side of the machine into line with the gear, and operates the slide to cause the transferring-cams to follow the ordinary needle-cams, to again operate the needles, which is the first part of the transferring operation. As the slide-bars reach the central part of their movement, another advance of the pattern-chain takes place and brings the same roller which struck the spur into contact with a push-pin, which latter shifts the cams on the main shaft to bring them into range with the levers which operate the points on one side of the machine. The first effect of this movement is to cause the points to advance over the hooks of the needles. The next effect is to depress them into engagement with the hooks. Next in succession the points continue to advance simultaneously with the retreat of the needles, the continued advance being timed with the movement of the needle-cam for that purpose. When this movement has taken place sufficiently for the point to take the loop, further operation of the mechanism causes the points to rise, and immediately thereafter the push-pin on the frame strikes the slide-rack and shifts the points from one needle to another. The points are then operated backward simultaneously and in unison with the advance of the needles until the loop is taken by the needle, when the points retreat to their normal position. Another narrowing movement takes place on the other side of the machine from another set of mechanism in precisely the same manner in the next round of knitting, and the operation is repeated as often as is required during the process of knitting, its frequency depending upon the arrangement of the rollers upon the pattern-chain.

The order of movement of needles and points in transferring stitches is illustrated in Figs. 24 to 29, inclusive. In Fig. 24 a portion of the series of needles on the rear of the machine have been operated forward through the stationary loops $b$ until the eyes $x$ of the needles are exposed. The stitches are then in apposition about half-way between the rivets and the ends of the latches of the needles. Fig. 25 shows the transfer-points operated forward over the hooks of the needles and depressed so that the extreme sloping ends of the points are inserted in the slots or eyes of the needles, the hooks of the needles being covered by the points. Fig. 26 shows the needles operated backward and the points in unison therewith, through the loops, until the loops are held by the points. Fig. 27 shows the stitches raised by the points, to be conveyed to other needles. Fig. 28 shows the points shifted to and engaged with other needles in the row, and one outside needle raised to prevent it from catching the thread in the next round of knitting. Fig. 29 shows the needles operated forward until the needles have received the loops from the points, which have been returned to their normal position, as in Fig. 24. The needles and points have now completed their narrowing movements.

The method above described I do not claim in this application, it being fully described and claimed in the separate application filed by me in the United States Patent Office on the 5th day of May, 1885, Serial No. 164,455.

An advantage may be here pointed out in the operation of the machine arising from the construction of the cam mechanism, which causes the movements of the parts that immediately operate the points in the loop-transferring operation. The cams for operating the mechanism upon one side are connected to one spline and those upon the other to another spline, and each therefore moves only a single step. In machines heretofore constructed the mechanism carried by the main shaft and operating the stitch-transferring mechanism has been made to advance first one step and then another, the first step operating the points upon one side and the next those upon the other side. At the end of the second step the cams are returned to their normal position. This construction renders it impracticable to run the machine at a high rate of speed, for the reason that when so run the momentum of the machine may cause it to move in excess of the first step, and thus narrow on the wrong side, interfering with the knitting operation on that side; but as in my machine the cams move but a single step, and each moves independently of the other, these parts may be moved as rapidly as any other parts of the machine, as there can be no excess of movement. Further, the independent movement of the cams on separate splines for front and rear renders it practicable to narrow or widen on each side independently of the other, as may be done on the machine herein shown in knitting flat or ribbed fabrics. It also renders it practicable to narrow on both sides of the machine at once, as the needles of the two rows alternate with each other in respect to position and to intermediate spaces, and it is necessary only to set the rollers that operate the mechanisms on each side of the same bar. This simultaneous operation of the narrowing mechanism on both sides is, however, more practicable with the coarser gages of needles.

I claim as my invention—

1. The combination, with a series of latch-needles and transfer-points, of mechanism, substantially as described, for advancing the needles through the loops until the loops are between the rivets and the ends of the latches and for returning the same to their normal position, and mechanism for advancing and withdrawing the transfer-points simultaneously or in unison with the advancing or retracting movements of the needles, to effect the transfer of the loops from the needles to the points and from the points to the needles, and for shifting the points laterally, all substantially as described.

2. The combination of two parallel rows of latch-needles, means for operating the same for the purpose of knitting, and mechanism, substantially as described, for imparting a forward and backward movement to the needles to facilitate the transfer of stitches with transfer-points, mechanism, substantially as described, for imparting a forward and backward movement to the said points in unison with the movement of the needles, and a lateral movement to effect the shifting of the stitches, and pattern devices, substantially as described, for controlling the movements of the parts, all operating to actuate the needles and points to effect the transfer of stitches independently of but simultaneously with the operation of the mechanism for operating the needles for knitting, substantially as and for the purpose set forth.

3. The combination, with a row of needles of a straight-latch-needle knitting-machine, mechanism for actuating the same for the purpose of knitting, and the main driving-shaft, of mechanism, substantially as described, by which the needles are operated forward and backward to facilitate the transfer of stitches, arranged to follow the knitting movements, pattern mechanism for controlling the operation of the said mechanism for operating the needles forward and backward, transfer-points, mechanism, substantially as described, whereby the same are operated from the main driving shaft and caused to move in unison with the needles, and devices, substantially as described, under the control of the pattern mechanism, whereby the shifting mechanism is operated automatically and simultaneously with the knitting movements, substantially as described.

4. The combination, with the row of needles of a straight-latch-needle knitting-machine, the mechanism for operating the same for the purpose of knitting, and the main driving shaft, of mechanism, substantially as described, for operating the needles forward and backward to facilitate the transfer of stitches, arranged to follow the ordinary knitting movement and connected to the main driving-shaft, a pattern mechanism for controlling the operation of the said mechanism for moving the needles forward and backward, transfer-points, mechanism, substantially as described, for causing them to move forward and backward in unison with the needles and laterally to shift the stitches, said mechanism being connected, substantially as described, with the main driving-shaft, and controlled also by the pattern mechanism, and mechanism, substantially as described, for throwing the empty needles out of work, whereby the shaping mechanism is operated automatically without interrupting the operation of the knitting mechanism, substantially as described.

5. The combination, with the two rows of needles of a straight-latch-needle knitting-machine, the mechanism for operating the same for the purpose of knitting, and the main driving-shaft, of an independent operating mechanism for each row of needles, consisting of mechanism, substantially as described, by which the needles are operated forward and backward to facilitate the transfer of stitches, arranged to follow the ordinary needle movements, and connected to the main driving-shaft, a pattern mechanism, substantially as described, controlling the action of the said operating mechanisms, independent sets of transfer-points for each row of needles, and independent sets of operating mechanisms, substantially as described, connected with the main driving-shaft and controlled independently by the pattern mechanism for moving said points forward and backward in unison with the needles, and laterally to shift the stitches, all substantially as described.

6. The combination, with the row of needles of a straight-latch-needle knitting-machine, the means for operating the same for the purpose of knitting, and the main driving-shaft, of operating mechanism, substantially as described, for operating the needles forward and back to facilitate the transfer of stitches, connected independently with the main driving-shaft and arranged to follow the knitting movement, and constructed to advance the needles to a point where the loops rest upon the open latches, transfer-points connected with the main driving-shaft, mechanism, substantially as described, for moving said points forward and backward in unison with the needles, and laterally to shift the stitches, and a pattern mechanism controlling the operation of the transferring mechanism, all substantially as described.

7. The combination, with a row of needles of a straight-latch-needle knitting-machine, of mechanism, substantially as described, for operating the needles backward and forward to facilitate the transfer of stitches, a transfer point or points, a point-carrier arranged to slide forward and backward approximately in the plane of the row of needles, mechanism for moving said carrier backward and forward, mechanism, substantially as described, for depressing the point or points for engagement with the needles, mechanism, substantially as described, for automatically moving the points laterally upon the frame by which they are carried, and a pattern mechanism, substantially as described, for controlling the operation of the parts, all substantially as described.

8. The combination, with a row of needles of a straight-latch-needle knitting-machine, of mechanism, substantially as described, for operating the needles to transfer the loops, the transfer-point, a point-carrier which is arranged to slide forward and backward approximately in the plane of the row of needles, mechanism for moving said carrier forward and backward, mechanism, substantially as described, for depressing the points for engagement with the needles, and a pawl-and-slide rack mechanism for automatically moving the points laterally from needle to needle in either direction at the will of the operator, substantially as described.

9. The combination, with the needles and the slide-bar and needle-cam of a straight-latch-needle knitting-machine, of a longitudinally-grooved cam having a flaring mouth adapted to receive the heels of the needles, mechanism, substantially as described, for moving it forward and backward, and transfer-points to effect the transfer of stitches, substantially as described.

10. The combination, with the needles and the slide-bar and needle-cam of a straight-latch-needle knitting-machine, of a longitudinally-grooved cam, having a flaring mouth, and adapted to receive the heels of the needles, mechanism for moving it forward and backward to facilitate the transfer of stitches, consisting of a sliding plate having suitable inclined slots, studs connected with the grooved cam, a gear, a link by which said gear is connected to the slide, a rack, and means, substantially as described, by which said rack is thrown into engagement with the gear at the proper time, substantially as described.

11. The combination, with the longitudinally-grooved cam, its studs, the slide which moves the longitudinally-grooved cam, a gear connected to said slide by a pitman, the sliding bar, a rack, 20, having lateral movement into and out of engagement with the gear, and means for holding the gear from turning when not in engagement with the rack, a lever adapted to be operated by the main driving mechanism, means for connecting said rack with said lever, the main driving mechanism, a pattern-chain, and means controlled by the pattern-chain for causing the said driving mechanism to act upon the lever, all substantially as described.

12. The combination, with the slide-bar, the longitudinally-grooved cam, and the needles, of the lever 31, an intermediate mechanism, substantially as described, between this lever and the grooved cam, a point-carrier, the levers 64 and 73, intermediate mechanism, substantially as described, whereby said point-carrier is operated from said levers, the driving-shaft, cams 45, 82, and 76, a spline to which said cams are connected, and a pattern mechanism, whereby said cams may be thrown into range with the levers, substantially as described.

13. The combination, with the two rows of needles, the described mechanism for operating the needles to facilitate the transfer of the loops, of transfer-points for each row and levers and intermediate devices, substantially as described, for operating the same in unison with the movement of the needles, the main driving-shaft, two independent sets of cams, an independent movable spline to which each set of cams is connected, a pattern mechanism, and mechanism, substantially as described, operated by the pattern mechanism, for moving these cams on the main shaft into range with the levers for operating the transfer-points, and means for returning the cams to their normal position, substantially as described.

14. The combination, with the lever 35, and the movable roller connected thereto, of the lever 41, having a spur, 49, intermediate connections, substantially as described, between said lever and the roller upon the lever 35 and the pattern-chain, substantially as described.

15. The combination, with the series of latch-needles, the grooved transfer-cam, means, substantially as described, for operating the same, and the ordinary needle-operating mechanism, of a point-carrier having forward and backward movement substantially parallel with the needle, and carrying points adapted to move laterally on the point-carrier, the main driving-shaft, mechanism, substantially as described, driven from the main shaft, for causing the carrier to move forward and backward, mechanism, substantially as described, for moving the points laterally, also connected with the main driving-shaft, and a pattern mechanism, substantially as described, for controlling the operation of the mechanism for operating the points and point-carrier, all substantially as described.

16. The combination, with the series of latch-needles, the grooved transfer-cam, means for operating said cam, substantially as described, and the ordinary needle-operating mechanism, of a point-carrier having forward and backward movement substantially parallel with the needles, and transfer-points adapted to move laterally on the point-carrier, the main driving-shaft, mechanism, substantially as described, driven from the main driving-shaft, for causing the carrier to move forward and backward, mechanism, substantially as described, for moving the points laterally, also connected with the main driving-shaft, mechanism, substantially as described, for depressing the points for bringing them into engagement with the needles, also connected with the main driving-shaft, and the pattern mechanism for controlling the operation of the mechanism for operating the points and point-carrier, substantially as described.

17. The combination, with the points and the point-carrier and its guideways, of the pinions meshing with racks upon the carrier, the lever 33, provided with rack 72 and with the anti-friction roller 75, and the cam 76, substantially as described.

18. The points and point-block, the point-carrier, a sliding rack on the point-carrier, and a pawl connected with the point-block adapted to engage with said rack, in combination with a push-pin, a movable frame carrying said push-pin, the slide-bars, said frame being adapted to be moved by the slide-bars near the end of their movement, and means for returning the frame and the rack, substantially as described.

19. The points and point-block, the point-carrier, the sliding rack 66 on the point-carrier, a pawl connected with the point-block, adapted to engage therewith, a second sliding rack, 112, with reversing connections, substantially as described, between the racks 66 and 112, and the pawl 115 on the point-block, in combination with a push-pin, a movable frame carrying said push-pin, the slide-bars, said movable frame being adapted to be moved by the slide-bars near the end of their movement, and means for returning the frame and the sliding racks, substantially as described.

20. A slide having a finger, 101, and a rack upon its face, in combination with a pawl, 102, a sliding bar, 103, having a lug adapted to be moved by the spur of a plate, 107, spring 199, plate 107, and the cam-slide, substantially as described.

21. A sliding bar having finger 101, and two racks set reversely to each other, in combination with the pawls 102 and 116, means, substantially as described, for connecting said pawls, the sliding rod 103, provided with a lug and adapted to be moved by the plate 107, spring-plate 199, plate 107, and the cam slide-bar, all substantially as described.

22. In combination with the slide-bar carrying the finger 101 and formed with a rack, the pawl, the sliding rod formed with the lug and carrying said pawl, the spring 199, the sliding plate 107, having a spur and held in place by frictional contact, the cam slide-bar, the elongated grooved cam, means to move the same, and the screw set in the elongated grooved cam and projecting through the slot to strike the plate 107, all substantially as described.

23. The combination, with a spindle having a reversible thread-guide on its lower end, of a sleeve surrounding the spindle and having an inclined slot therein, a stud set in the spindle and projecting into the inclined slot in the sleeve surrounding the spindle, a stud set in the sleeve, and mechanism, substantially as described, to operate upon this stud, for giving the sleeve vertical movement at the end of the stroke, substantially as described.

In testimony whereof I have signed my name to this specification in the presence of two subscribing witnesses.

FRANK WILCOMB.

Witnesses:
   FRANK L. MIDDLETON,
   CHAS. L. STURTEVANT.